United States Patent
Joe et al.

(10) Patent No.: US 6,931,316 B2
(45) Date of Patent: Aug. 16, 2005

(54) TOROIDAL CONTINUOUSLY VARIABLE TRANSMISSION CONTROL APPARATUS

(75) Inventors: Shinichiro Joe, Kanagawa (JP); Taketoshi Kawabe, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 259 days.

(21) Appl. No.: 10/436,162

(22) Filed: May 13, 2003

(65) Prior Publication Data

US 2003/0228952 A1 Dec. 11, 2003

(30) Foreign Application Priority Data

Jun. 5, 2002 (JP) .......................................... 2002-164849
Aug. 26, 2002 (JP) .......................................... 2002-245210

(51) Int. Cl.⁷ .......................... G06F 17/00; F16H 37/02
(52) U.S. Cl. .......................... 701/61; 701/51; 701/95; 475/208; 475/216; 477/50; 180/197
(58) Field of Search .......................... 701/51, 52, 60, 701/61, 66, 94, 95; 475/208, 216, 218; 477/50, 28, 49; 180/197

(56) References Cited

U.S. PATENT DOCUMENTS 6,312,357 B1 * 11/2001 Sakai et al. ............... 477/37
6,383,115 B1 * 5/2002 Kawamura ................. 477/50
6,405,611 B1 * 6/2002 DeJonge et al. ........... 74/335
6,409,625 B1 * 6/2002 Sakai et al. ............... 475/208
6,436,001 B1 * 8/2002 Sakai et al. ............... 475/216

FOREIGN PATENT DOCUMENTS

JP        8-93873 A       4/1996
JP        8-178042 A      7/1996

OTHER PUBLICATIONS

U.S. Appl. No. 10/436,077, filed May 13, 2003, Joe et al.

* cited by examiner

Primary Examiner—Thomas G. Black
Assistant Examiner—Arthur D. Donnelly
(74) Attorney, Agent, or Firm—Foley & Lardner LLP

(57) ABSTRACT

In a toroidal continuously variable transmission (TCVT) control apparatus with a variator unit and a ratio control hydraulic system, an electronic TCVT control unit electronically feedback-controls a transmission ratio based on a deviation from a desired transmission ratio, and generates a normal-period command signal to be input to a step motor for compensating for the deviation. The control unit determines whether the deviation can be compensated for by electronically feedback-controlling the transmission ratio based on the deviation and generates an abnormal-period command signal to be input to the step motor to realize a step-motor displacement capable of shifting or diverging the transmission ratio to a speed-reduction side, while keeping a trunnion out of contact with a stopper in the direction of the trunnion axis, when the deviation cannot be compensated for by electronically feedback-controlling the transmission ratio based on the deviation.

20 Claims, 16 Drawing Sheets

TOROIDAL CONTINUOUSLY VARIABLE TRANSMISSION CONTROL APPARATUS

TECHNICAL FIELD

The present invention relates to a toroidal continuously variable transmission (TCVT) control apparatus for an automotive vehicle, and specifically to technologies for controlling ratio changes in a toroidal continuously variable transmission being in a reverse operating mode.

BACKGROUND ART

In recent years, there have been proposed and developed various toroidal continuously variable transmissions, often abbreviated to "TCVTs", employing two different ratio control hydraulic systems, namely forward and reverse ratio control hydraulic systems. Japanese Patent Provisional Publication No. 8-93873 (hereinafter is referred to as JP8-93873) teaches technologies for controlling a TCVT employing both forward and reverse ratio control hydraulic systems, in presence of a reverse ratio control hydraulic system failure during a reverse operating mode, or when the forward ratio control hydraulic system is erroneously used instead of the reverse ratio control hydraulic system during the reverse operating mode. For instance, in presence of the reverse ratio control hydraulic system failure during the reverse operating mode, the control system disclosed in JP8-93873 outputs a command signal to a ratio control actuator associated with a forward ratio control valve so that the transmission ratio shifts toward a high gear ratio (a speed-increase side) while using the forward ratio control hydraulic system. The TCVT has a trunnion serving as a power roller support that rotatably supports a power roller, which is interposed between input and output disks and is in contact with a torus surface of each of the input and output disks under preload. As is generally known, in the TCVT, the trunnion is vertically offset from the common rotation center of input and output disks in one axial direction of its trunnion axis during a forward operating mode. Conversely during a reverse operating mode, the trunnion normally shifts from the common rotation center in the opposite direction of its trunnion axis. That is, shifting the transmission ratio toward the high gear ratio while using the forward ratio control hydraulic system during the reverse operating mode, practically means shifting the transmission ratio toward a low gear ratio. As a result, it is possible to start the vehicle at a low gear ratio even in the presence of the reverse ratio control hydraulic system failure during the reverse operating mode. For the reasons discussed below, the TCVT commonly uses forward and reverse ratio control hydraulic systems. Generally, a trunnion vertical offset versus power-roller tilt angle (correlated to a transmission ratio) characteristic is somewhat unstable. To enhance this characteristic, a so-called precision cam is often provided to mechanically transmit both the tilting motion (a gyration angle or tilt angle of the power roller) of the trunnion and the vertical offset (vertical displacement) of the trunnion via the precision cam to a ratio control valve spool of a ratio control hydraulic system, which serves to feed hydraulic oil to a servo piston depending on a displacement of the ratio control actuator. By way of feedback action of the precision cam, the tilt angle of the power roller and the vertical offset of the trunnion are both fed back to the ratio control valve spool, thereby mechanically stabilizing the trunnion vertical offset versus power-roller tilt angle characteristic. Rotation directions of input and output disks during the forward operating mode are opposite to rotation directions of the input and output disks during the reverse operating mode. As a matter of course, the direction of trunnion tilting motion with respect to the trunnion vertical offset during the forward operating mode is opposite to that created during the reverse operating mode. Thus, one of two different ratio control hydraulic systems, each having a different polarity, is used as a forward ratio control hydraulic system, whereas the other is used as a reverse ratio control hydraulic system. Switching between the forward and reverse ratio control hydraulic systems is achieved by means of a forward/reverse changeover valve.

On the other hand, Japanese Patent Provisional Publication No. 8-178042 (hereinafter is referred to as JP8-178042) teaches technologies for stably driving a ratio control actuator of a continuously variable transmission (CVT) while preventing the ratio control actuator from being large-sized. The CVT control system disclosed in JP8-178042 calculates a desired transmission ratio based on engine/vehicle operating conditions, and brings a ratio control valve spool closer to a stroke position corresponding to the desired transmission ratio by operating the ratio control actuator such as a step motor. Bringing the ratio control valve spool closer to the desired stroke position produces a speed-change control pressure corresponding to the desired transmission ratio. In this manner, the transmission ratio of the CVT can be steplessly varied toward the desired ratio responsively to the speed-change control pressure. However, a viscosity of working fluid used within the CVT varies depending on a working-fluid temperature, such that the viscosity increases as the working-fluid temperature falls. Usually, a valve body of the ratio control valve is made of aluminum alloy, whereas a spool of the ratio control valve is made of iron. The clearance between the valve body and the valve spool tends to reduce, as the working-fluid temperature falls. For the reasons set out above, at low working-fluid temperatures, the viscous resistance against the stroke of the valve spool tends to increase. Therefore, a greater driving force of the ratio control actuator (e.g., a step motor) has to be generated when the CVT is still cold and thus the working-fluid temperature is low. From the fact that it is possible to reduce the required driving force of the ratio control actuator by reducing or decreasing a ratio-control-actuator driving speed for the same working-fluid temperature, in other words, for the same viscous resistance against the stroke of the valve spool, JP8-178042 variably controls the ratio-control-actuator driving speed depending on the working-fluid temperature. This effectively reduces the required driving force of the ratio control actuator even when the CVT is cold, thus preventing the ratio control actuator from being large-sized undesirably.

SUMMARY OF THE INVENTION

In the system disclosed in JP8-93873, when increasing the command signal value needed to drive the ratio control actuator toward a high gear ratio (a speed-increase side) so as to change the transmission ratio toward a low gear ratio (a speed-reduction side) during the reverse operating mode, the trunnion vertical offset may become greater. Suppose the command signal value needed to drive the ratio control actuator has excessively increased toward the speed-increase side. In such a case, there is a possibility of an undesirable collision-contact between the trunnion and a stopper (concretely, a cylinder for a servo piston that produces a displacement of the trunnion in the direction of the trunnion axis) due to the excessive vertical displacement of the trunnion. The tilting motion of the trunnion held in contact with the stopper owing to the excessive vertical offset, causes undesired wear at contact points therebetween. In case that the CVT has a plurality of power rollers, the maximum vertical offsets of trunnions associated with the respective power rollers are slightly different from each other, because of each power-roller's individual machining accuracies. Under a particular condition where the trunnions are held in contact with their stoppers in the direction of the trunnion axis, trunnion tilting speeds are also slightly different from each other, owing to the slightly different maximum vertical offsets. Thus, in a transient state that the trunnions are shifting in such a manner as to be brought into contact with the respective stoppers each restricting a tilt angle of the trunnion, there is a tendency for trunnion tilt angles to slightly differ from each other. This means an increase in slippage between each of the power rollers and the associated input and output disks in a very limited contact zone between each power roller and the associated input and output disks. The increased slippage may result in undesired wear and heat generation in the very limited contact zone, thus reducing the durability of the toroidal CVT. The technologies disclosed in JP8-93873can be also applied to a particular case that the deviation of an actual transmission ratio from a desired ratio cannot be satisfactorily compensated for by way of feedback control in a reverse operating mode of a TCVT employing a sole ratio control hydraulic system that serves as a reverse ratio control hydraulic system as well as a forward ratio control hydraulic system. However, basically, such a TCVT has the previously-noted problems, that is, undesired wear owing to undesired contact with the stopper, heat generation, and lowered durability. The state that the deviation of an actual transmission ratio from a desired ratio cannot be satisfactorily compensated for by way of feedback control in a reverse operating mode may occur under the following conditions:

(i) 1st condition where it is impossible to detect a transmission ratio during a reverse operating mode in presence of a sensor system failure or a failure of a sensor that detects or monitors the transmission ratio; and (ii) 2nd condition where the driving speed for the ratio control actuator is forcibly decreasingly compensated for owing to a fall in working-fluid temperature, according to the actuator speed control as disclosed in JP8-178042.

As set forth above, as a matter of course, when the deviation of the actual transmission ratio from the desired ratio cannot be accurately compensated for by way of feedback control, the transmission ratio changes toward either the speed-increase side (high ratio) or the speed-reduction side (low ratio). When the transmission ratio is changing toward the speed-reduction side (low ratio), there is a less problem, since a desired ratio suited to the reverse operating mode is set to a value closer to the lowest gear ratio, and additionally changing the transmission ratio to the speed-reduction side (low ratio) means a driving torque increase. On the contrary when the transmission ratio is changing toward the speed-increase side (high ratio), there is a possibility of a poor acceleration feel during a vehicle's starting period. This is because changing the transmission ratio to the speed-increase side (high ratio) means a driving torque decrease or a so-called "high-ratio starting".

Accordingly, it is an object of the invention to provide a ratio control apparatus of a toroidal continuously variable transmission (TCVT), capable of ensuring stable ratio changes in a reverse operating mode as well as in a forward operating mode, while enhancing the durability of the TCVT.

In order to accomplish the aforementioned and other objects of the present invention, a toroidal continuously variable transmission control apparatus for an automotive vehicle comprises a variator unit comprising an input disk and an output disk coaxially arranged and opposing each other and having a common rotation axis, a power roller interposed between the input and output disks to transmit torque from the input disk to the output disk via a traction oil film formed between the power roller and each of the input and output disks, using a shearing force in the traction oil film, and a trunnion that supports a backface of the power roller so that the power roller is rotatable about a power-roller rotation axis, the trunnion being movable in a direction of a trunnion axis perpendicular to the common rotation axis of the input and output disks and the power-roller rotation axis to cause a tilting motion of the power roller and to continuously vary a transmission ratio, a ratio control hydraulic system comprising a hydraulic actuator producing a displacement of the trunnion in the trunnion-axis direction from an initial position at which the power-roller rotation axis intersects the common rotation axis of the input and output disks, a control valve hydraulically controlling operation of the hydraulic actuator, a ratio control actuator mechanically linked to the control valve to adjust a valve position of the control valve by changing a displacement of the ratio control actuator, and a mechanical feedback device compensating for a difference of a tilt angle of the power roller between forward and reverse operating modes and serving as a positive feedback device in the reverse operating mode and also serving as a negative feedback device in the forward operating mode during which a ratio-control-actuator displacement versus transmission ratio characteristic is relatively stable in comparison with the reverse operating mode, and a control unit comprising a desired transmission ratio setting section setting a desired transmission ratio, a transmission ratio detection section detecting a transmission ratio, a normal-period ratio control section electronically feedback-controlling the transmission ratio based on a deviation of the transmission ratio from the desired transmission ratio so that the transmission ratio is brought closer to the desired transmission ratio, and generating a normal-period command signal to be input to the ratio control actuator for compensating for the deviation, ratio deviation compensation enabled/disabled state determination section determining whether or not the deviation can be compensated for by the normal-period ratio control section, and an abnormal-period ratio control section generating an abnormal-period command signal to be input to the ratio control actuator to realize a ratio-control-actuator displacement capable of shifting the transmission ratio to a speed-reduction side, while keeping the trunnion out of contact with a stopper in the direction of the trunnion axis, when the ratio deviation compensation enabled/disabled state determination section determines that the deviation cannot be compensated for by the normal-period ratio control section.

According to another aspect of the invention, a toroidal continuously variable transmission control apparatus for an automotive vehicle comprising a variator unit comprising an input disk and an output disk coaxially arranged and opposing each other and having a common rotation axis, a power roller interposed between the input and output disks to transmit torque from the input disk to the output disk via a traction oil film formed between the power roller and each of the input and output disks, using a shearing force in the traction oil film, and a trunnion that supports a backface of the power roller so that the power roller is rotatable about a power-roller rotation axis, the trunnion being movable in a direction of a trunnion axis perpendicular to the common rotation axis of the input and output disks and the power-roller rotation axis to cause a tilting motion of the power roller and to continuously vary a transmission ratio, a ratio control hydraulic system comprising a hydraulic actuator producing a displacement of the trunnion in the trunnion-axis direction from an initial position at which the power-roller rotation axis intersects the common rotation axis of the input and output disks, a control valve hydraulically controlling operation of the hydraulic actuator, a ratio control actuator mechanically linked to the control valve to adjust a valve position of the control valve by changing a displacement of the ratio control actuator, and a mechanical feedback device compensating for a difference of a tilt angle of the power roller between forward and reverse operating modes and serving as a positive feedback device in the reverse operating mode and also serving as a negative feedback device in the forward operating mode during which a ratio-control-actuator displacement versus transmission ratio characteristic is relatively stable in comparison with the reverse operating mode, and a control unit comprising means for setting a desired transmission ratio based on a vehicle speed and an accelerator depression amount, means for detecting a transmission ratio based on an input-disk speed and an output-disk speed, means for electronically feedback-controlling the transmission ratio based on a deviation of the transmission ratio from the desired transmission ratio so that the transmission ratio is brought closer to the desired transmission ratio, and generating a normal-period command signal to be input to the ratio control actuator for compensating for the deviation, means for generating an abnormal-period command signal to be input to the ratio control actuator to realize a ratio-control-actuator displacement capable of shifting the transmission ratio to a speed-reduction side, while keeping the trunnion out of contact with a stopper in the direction of the trunnion axis, and means for determining whether or not the deviation can be compensated for by the normal-period ratio control section, and for inputting the normal-period command signal to the ratio control actuator when the deviation can be compensated for by the normal-period ratio control section, and for inputting the abnormal-period command signal to the ratio control actuator when the deviation cannot be compensated for by the normal-period ratio control section.

According to a still further aspect of the invention, a method of controlling a toroidal continuously variable transmission for an automotive vehicle employing a variator unit including input and output disks coaxially arranged and opposing each other and having a common rotation axis, a power roller interposed between the input and output disks to transmit torque from the input disk to the output disk via a traction oil film formed between the power roller and each of the input and output disks, using a shearing force in the traction oil film, and a trunnion that supports a backface of the power roller so that the power roller is rotatable about a power-roller rotation axis, the trunnion being movable in a direction of a trunnion axis perpendicular to the common rotation axis of the input and output disks and the power-roller rotation axis to cause a tilting motion of the power roller and to continuously vary a transmission ratio, and a ratio control hydraulic system including a pressure-differential operated hydraulic servo mechanism producing a displacement of the trunnion in the trunnion-axis direction from an initial position at which the power-roller rotation axis intersects the common rotation axis of the input and output disks, a control valve creating a pressure differential for operating the hydraulic servo mechanism, a step motor mechanically linked to the control valve to adjust a valve position of the control valve by changing a displacement of the step motor, and a mechanical feedback device compensating for a difference of a tilt angle of the power roller between forward and reverse operating modes and serving as a positive feedback device in the reverse operating mode and also serving as a negative feedback device in the forward operating mode during which a ratio-control-actuator displacement versus transmission ratio characteristic is relatively stable in comparison with the reverse operating mode, the method comprises setting a desired transmission ratio based on a vehicle speed and an accelerator depression amount, detecting a transmission ratio based on an input-disk speed and an output-disk speed, electronically feedback-controlling the transmission ratio based on a deviation of the transmission ratio from the desired transmission ratio so that the transmission ratio is brought closer to the desired transmission ratio, and generating a normal-period command signal to be input to the step motor for compensating for the deviation, determining whether or not the deviation can be compensated for by electronically feedback-controlling the transmission ratio based on the deviation, and generating an abnormal-period command signal to be input to the step motor to realize a step-motor displacement capable of shifting the transmission ratio to a speed-reduction side, while keeping the trunnion out of contact with a stopper in the direction of the trunnion axis, when the deviation cannot be compensated for by electronically feedback-controlling the transmission ratio based on the deviation.

The other objects and features of this invention will become understood from the following description with reference to the accompanying drawings.

DESCRIPTION OF THE PREFERRED EMBODIMENTS

Figure 1:
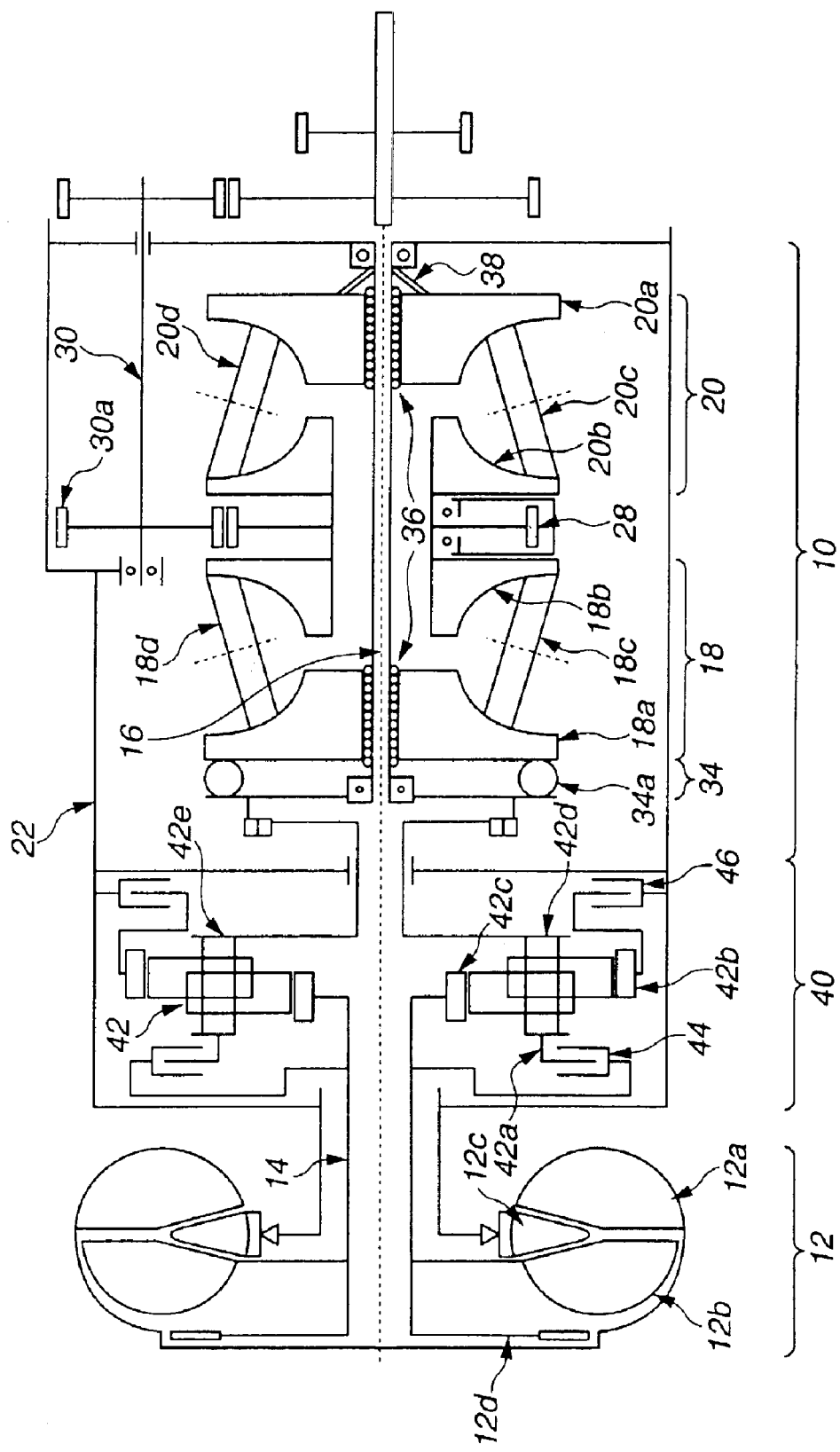
FIG. 1 is a skeleton diagram illustrating one embodiment of a toroidal continuously variable transmission (TCVT).

Referring now to the drawings, particularly to FIG. 1, a toroidal continuously variable transmission (TCVT) 10 of the embodiment is exemplified in a half-toroidal continuously variable transmission combined with a lock-up torque converter 12. In the power train for the TCVT of the embodiment shown in FIG. 1, engine torque (driving torque) is transmitted from an engine (not shown) serving as a prime mover via lock-up torque converter 12 and a forward and reverse changeover mechanism 40 (described later) to TCVT 10. Lock-up torque converter 12 has three major members, namely a pump impeller (a driving member) 12a, a turbine runner (a driven member) 12b, and a stator 12c. Lock-up torque converter 12 also includes a lock-up clutch 12d. As indicated by the central straight broken line in FIG. 1, a torque transmission shaft 16 of TCVT 10 is coaxially arranged with respect to a torque-converter output rotation axis 14 of lock-up torque converter 12. At the subsequent stage of F/R changeover mechanism 40, a front toroidal CVT mechanism (or a first variator unit) 18 and a rear toroidal CVT mechanism (or a second variator unit) 20 are set in tandem and coaxially arranged on torque transmission shaft 16. Such an arrangement of the two variators is often called as a "double cavity type toroidal CVT". First and second toroidal CVT mechanisms 18 and 20 are the same in construction. First toroidal CVT mechanism 18 is comprised of a pair of input and output disks 18a and 18b coaxially arranged and opposing each other, a pair of power rollers 18c and 18d, a power roller support or a trunnion 23 (described later in reference to FIG. 2), and a servo piston 51 serving as a hydraulic actuator (described later in reference to FIG. 2). Each of first input and output disks 18a and 18b has a torus surface. Power rollers 18c and 18d are interposed between first input and output disks 18a and 18b such that power rollers 18c and 18d are in contact with the torus surfaces of the first input and output disks under axial preload. Power rollers 18c and 18d are symmetrically arranged to each other with respect to torque transmission shaft 16. In a similar manner, second toroidal CVT mechanism 20 is comprised of a pair of input and output disks 20a and 20b coaxially arranged and opposing each other, a pair of power rollers 20c and 20d, a power roller support or a trunnion 23 (described later in reference to FIG. 2), and a servo piston 51 serving as a hydraulic actuator (described later in reference to FIG. 2). Each of second input and output disks 20a and 20b has a torus surface. Power rollers 20c and 20d are interposed between second input and output disks 20a and 20b such that power rollers 20c and 20d are in contact with the torus surfaces of the second input and output disks under axial preload. Power rollers 20c and 20d are symmetrically arranged to each other with respect to torque transmission shaft 16. As seen from the skeleton diagram of FIG. 1, first and second CVT mechanisms 18 and 20 are arranged in reverse to each other on torque transmission shaft 16 such that first output disk 18b included in first toroidal CVT mechanism 18 and second output disk 20b included in second toroidal CVT mechanism 20 are opposed to each other with respect to an output gear 28, which is fitted onto torque transmission shaft 16 in a manner so as to permit rotation of output gear 28 relative to torque transmission shaft 16. On the other hand, input disks 18a and 20a are arranged outside of output disks 18b and 20b. Each of output disks 18b and 20b is splined to output gear 28 so as to permit axial sliding motion of each of the output disks and to prevent rotary motion of the same. Each of input disks 18a and 20a is supported on torque transmission shaft 16 by way of ball-spline-engagement 36, so as to permit each of the input disks to axially move relative to the torque transmission shaft, and to rotate about the torque transmission shaft. Engine power (torque) is transmitted from the input disk to the output disk via a traction oil film formed between the power roller and each of the input and output disks, using a shearing force in the traction oil film at high contact pressure. Torque transmitted to each of output disks 18b and 20b is transferred through output gear 28 and an input gear 30a in meshed-engagement with output gear 28 to a counter shaft 30, and further transmitted via an output torque transmission path to a TCVT output shaft. As can be seen substantially in the central portion of the skeleton diagram of FIG. 1, of two input disks 18a and 20a, first input disk 18a of first toroidal CVT mechanism 18 is preloaded axially rightwards (viewing FIG. 1) by means of a loading cam device 34. Loading cam device 34 is designed to produce the axial preload that is variable in proportion to input torque transmitted from lock-up torque converter 12 to F/R changeover mechanism 40. The magnitude of the axial preload produced by the loading cam device is substantially proportional to input torque transmitted from the lock-up torque converter to the TCVT input shaft. A loading cam 34a of loading cam device 34 is fitted to torque transmission shaft 16 to permit rotary motion of loading cam 34a about torque transmission shaft 16 and engaged with torque transmission shaft 16 via a thrust bearing (not shown). On the other hand, second input disk 20a of second toroidal CVT mechanism 20 is permanently biased axially leftwards (viewing FIG. 1) by means of a coned disc spring 38. Therefore, the axial preload produced by loading cam device 34 acts on first input disk 18a and also acts on second input disk 20a through torque transmission shaft 16 and coned disc spring 38. As a reaction force, the axial preload produced by coned disc spring 38 acts on second input disk 20a and also acts on first input disk 18a through torque transmission shaft 16 and loading cam device 34. F/R changeover mechanism 40 is comprised of a double-pinion type planetary gearset 42, a forward clutch 44, and a reverse brake 46. A planet-pinion carrier 42a of double-pinion type planetary gearset 42 is engaged with or disengaged from torque-converter output rotation axis 14 by means of forward clutch 44. When reverse brake 46 is applied, ring gear 42b of double-pinion type planetary gearset 42 is engaged with a TCVT housing 22 to hold ring gear 42b stationary. Conversely when reverse brake 46 is released, ring gear 42b is disengaged from TCVT housing 22 so that ring gear 42b can rotate. In FIG. 1, reference sign 42c denotes a sun gear of double-pinion type planetary gearset 42, reference sign 42d denotes a first pinion, and reference sign 42e denotes a second pinion. More concretely, when forward clutch 44 is engaged and reverse brake 46 is released, input rotation whose rotation direction is identical to the direction of rotation of the engine is transmitted via F/R changeover mechanism 40 to TCVT 10. Conversely when forward clutch 44 is disengaged and reverse brake 46 is applied, input rotation whose rotation direction is opposite to the direction of rotation of the engine is transmitted via F/R changeover mechanism 40 to TCVT 10. In this manner, F/R changeover mechanism 40 functions to transmit input rotation to the TCVT input shaft without changing a direction of rotation in a drive range (D range) of a forward operating mode. F/R changeover mechanism 40 also functions to transmit input rotation to the TCVT input shaft while changing a direction of input rotation in a reverse range (R range). That is, F/R changeover mechanism 40 reversibly transmits the input rotation of the engine to the input disk. F/R changeover mechanism 40 further functions to shut off power transmission to the TCVT input shaft in a parking range (P range) or a neutral range (N range). Each of power rollers 18c, 18d, 20c, and 20d is tilted by means of a ratio control valve 56 and a hydraulic actuator 50 both included in a ratio control system, so that the magnitude of the tilt angle of each power roller, based on engine/vehicle operating conditions, is attained. In accordance with a continuous change in the tilt angle, the torque is transmitted to each output disk while steplessly varying an input speed of each input disk.

Figure 2:
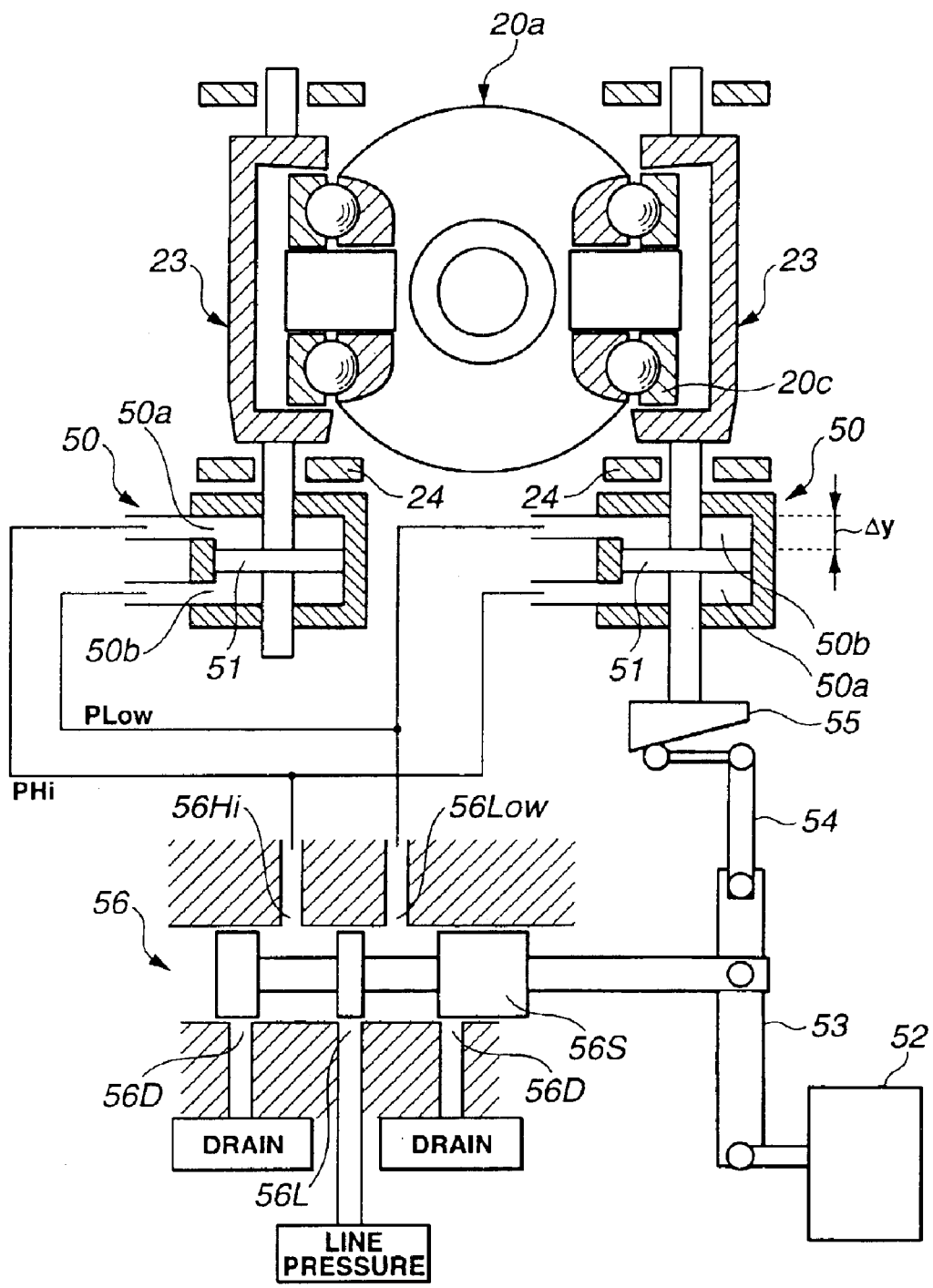
FIG. 2 shows a cross-sectional view and a ratio control hydraulic system block diagram of the TCVT of the embodiment.

Referring now to FIG. 2, there is shown the system block diagram of the ratio control hydraulic system used for controlling ratio changes in the TCVT. As seen from the cross section of FIG. 2, the backfaces of power rollers 18c, 18d, 20c, and 20d are supported by the associated trunnions 23, so that the power rollers are rotatable about the respective power-roller rotation axes. The lower end of the trunnion shaft of trunnion 23 is fixedly connected to the piston rod of servo piston 51 of hydraulic actuator (hydraulic servo mechanism or hydraulic servo) 50. An internal space of a cylinder of hydraulic servo 50 is divided into first and second chambers 50a and 50b. Servo piston 51 is axially shifted by way of a pressure differential between hydraulic pressures in first and second chambers 50a and 50b. First chamber 50a communicates a high-pressure port 56Hi of a shift control valve (or a ratio control valve) 56, while second chamber 50b communicates a low-pressure port 56Low of ratio control valve 56. Ratio control valve 56 has a ratio control valve spool 56S. In the shown embodiment, ratio control valve 56 is comprised of a three-land spool valve having three lands each associated with first and second drain ports 56D and 56D, and a line pressure port 56L. For example, when valve spool 56S moves axially rightwards from the neutral position shown in FIG. 2, fluid communication between high-pressure port 56Hi and line pressure port 56L is established and simultaneously fluid communication between low-pressure port 56Low and the right-hand drain port 56D is established. As a result, the pressure PHi in first chamber 50a rises, while the pressure PLow in second chamber 50b drops. In the TCVT, traction oil (called "continuously variable transmission fluid" abbreviated to "CVTF") is used as working fluid. In this manner, the pressure differential between first and second chambers 50a and 50b varies depending on the axial position of valve spool 56S. Each of servo pistons 51, 51, 51, 51 is coaxially connected onto the lower end of each of the trunnions, so as to tilt each of power rollers 18c, 18d, 20c, 20d by shifting trunnions 23, 23 of first toroidal CVT mechanism 18 in opposite directions of their trunnion axes perpendicular to the power-roller rotation axes and by shifting trunnions 23, 23 of second toroidal CVT mechanism 20 in opposite directions of their trunnion axes perpendicular to the power-roller rotation axes. That is, all of the trunnions are shifted in phase and synchronously with each other by means of the four servo pistons. As clearly shown in FIG. 2, the rightmost end of valve spool 56S is mechanically linked to both of an output shaft of a step motor (a ratio control actuator) 52 and a precision cam 55 via a linkage (53, 54). Precision cam 55 is attached to one of four trunnions 23, 23, 23, and 23 associated with the respective power rollers 18c, 18d, 20c, and 20d, in such a manner as to convert both the vertical displacement of power roller 20a and the tilt angle of power roller 20a into a displacement of the linkage. The axial displacement of valve spool 56S is determined depending on both the displacement of step motor 52 (i.e., the angular movements of step motor 52) and the input displacement fed back through precision cam 55 and the linkage.

During ratio changing, the power rollers are shifted from their neutral positions shown in FIG. 2 in phase and in synchronization with each other in directions of the trunnion axes perpendicular to the power-roller rotation axes through trunnions 23, 23, 23, 23 by means of servo pistons 51, 51, 51, 51. The neutral position corresponds to a non-ratio-changing position at which the power-roller rotation axis intersects the common rotation axis of the input and output disks. Shifting the power rollers from their neutral positions, in other words, vertically shifting the trunnions from their initial positions, causes an offset (a vertical displacement) of each of the power-roller rotation axes from the common rotation axis of the input and output disks, that is, the difference between the sense of a vector indicating the rotation direction of power roller 20c and the sense of a vector indicating the rotation direction of each of input and output disks 20a and 20b. Owing to the offset or vertical displacement, a side slip force occurs in a very limited contact zone between each of the power rollers and the associated input and output disks. By virtue of the side slip forces, the power rollers can be self-tilted or self-inclined in phase and in synchronization about the respective trunnion axes. Owing to the self-inclining motion of each of the power rollers, a first diameter of a circular-arc shaped locus drawn by movement of the very limited contact point between each of the power rollers and the output disk on the torus surface of the output disk and a second diameter of a circular-arc shaped locus drawn by movement of the very limited contact point between each of the power rollers and the input disk on the torus surface of the input disk, that is, a ratio of the first diameter to the second diameter can be continuously varied, thus continuously varying a transmission ratio of the double cavity type TCVT. A degree of progress for transmission-ratio changing is mechanically fed back to the hydraulic servo mechanism (servo pistons) by means of precision cam 55 (described above), such that each of the trunnions gradually returns to its initial position as the ratio changing progresses or advances. As soon as the tilt angle based on the desired transmission ratio corresponding to a transmission-ratio command signal value has been reached, the offset or vertical displacement of each of the trunnions is returned to zero, so as to stop the inclining motion of each power roller, and to attain the return of each power roller to neutral (that is, a balanced point), and thus to maintain the desired transmission ratio corresponding to the ratio command signal value. With each power roller (or each trunnion) held at the balanced point, valve spool 56S is also held at its neutral position shown in FIG. 2 at which drain ports 56D and 56D are closed by the right and left lands and line pressure port 56L is closed by the intermediate land of valve spool 56S. Each of trunnions 23 has a tilting-motion restriction stopper 24 that restricts or limits the maximum tilt angle of the power roller and thus prevents an excessive tilting motion of the power roller. Precision cam 55 serves as a mechanical feedback device that compensates for a tilting-motion difference of the power roller between forward and reverse operating modes. In the forward operating mode, precision cam 55 serves as a negative feedback device so that the tilt angle of power roller 20c is negatively fed back so as to reduce the axial displacement of valve spool 56S, and thus to compensate for the deviation of the power-roller tilt angle from the desired tilt angle. At the same time, the displacement of each of power roller 20c and trunnion 23 from the balanced point is also negatively fed back to the displacement of valve spool 56S. Such negative feedback provides a damping effect and stabilizes the amplification with respect to time in a transient state of ratio changing, thus suppressing undesired hunting of ratio changing control. Thus, in the forward operating mode, the step-motor displacement versus power-roller tilt angle characteristic, in other words, the ratio-control-actuator displacement versus transmission ratio characteristic is relatively stable. A final transmission ratio is determined based on the displacement of step motor 52. A series of ratio changing processes are described hereunder.

First, spool valve 56S axially moves from its neutral position by changing the displacement of step motor 52 (the number of angular steps of the step motor), and whereby ratio control valve 56 is shifted to its valve open position. At this time, the differential pressure between first and second chambers 50a and 50b of hydraulic servo 50 varies. As a result, trunnion 23 axially shifts in the direction of the trunnion axis from its balanced point. The trunnion axis is perpendicular to both the power-roller rotation axis and the common rotation axis of the input and output disks. This causes tilting motion of the power roller. As soon as the tilt angle of the power roller reaches an angle corresponding to the displacement of step motor 52, valve spool 56S returns to neutral. In this manner, a series of ratio changing processes terminate.

On the contrary, in the reverse operating mode, the sense of tilting motion of the power roller with respect to the vertical displacement of the power roller from its neutral position (the balanced point) is opposite to that obtained in the forward operating mode. In this case, precision cam 55 functions as a positive feedback device so that the tilt angle of power roller 20c is positively fed back so as to increase the axial displacement of valve spool 56S. Thus, in the reverse operating mode, there is a tendency that the tilt angle of the power roller cannot be accurately balanced to an angle corresponding to the displacement of step motor 52, owing to the positive feedback of precision cam 55. This results in an unstable step-motor displacement versus power-roller tilt angle characteristic.

Figure 3:
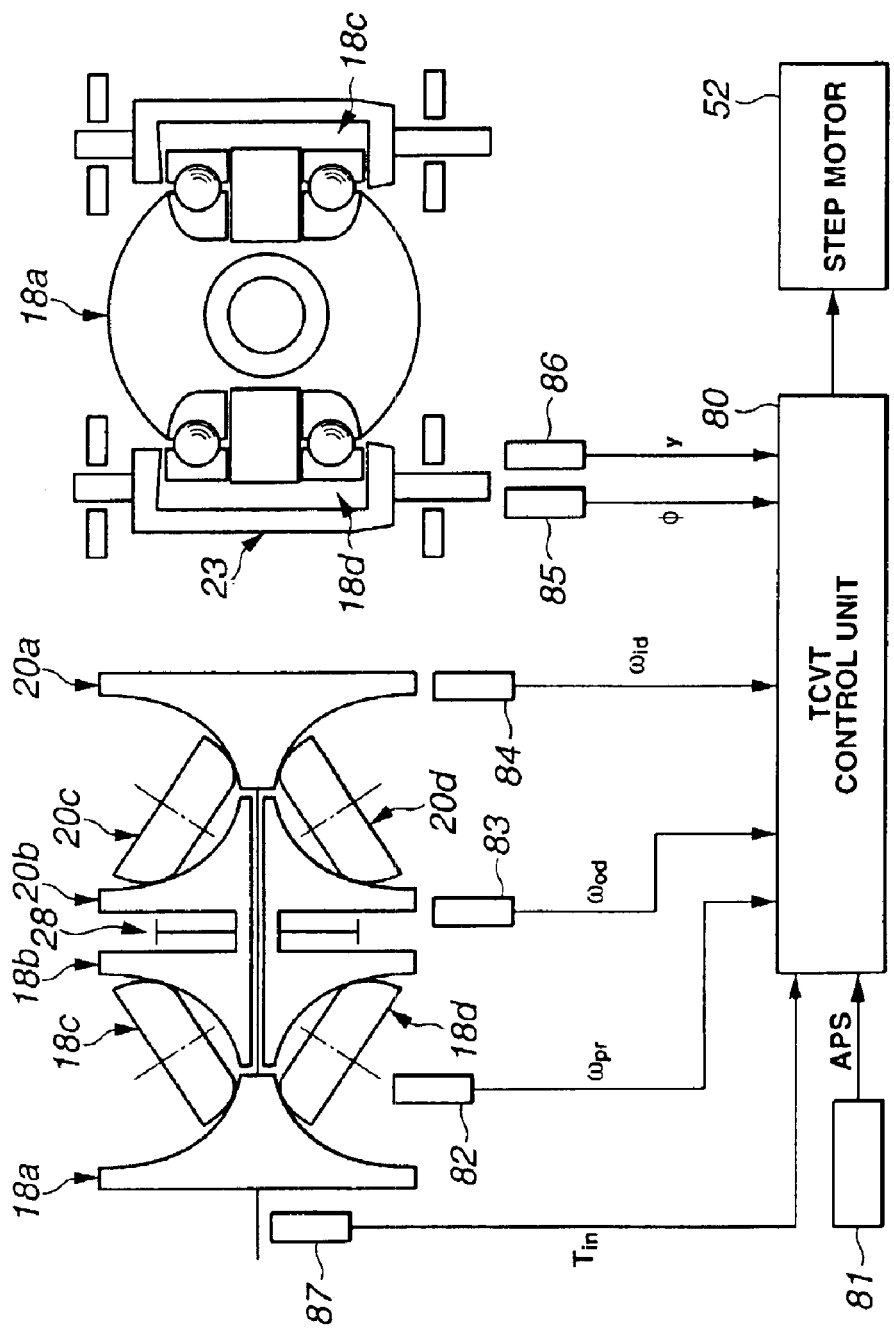
FIG. 3 is a system diagram illustrating a TCVT reverse ratio control system of the embodiment.

Referring now to FIG. 3, there is shown the electronic TCVT control apparatus employing the reverse ratio control system used in the reverse operating mode. As discussed above, during the reverse operating mode, the step-motor displacement versus power-roller tilt angle characteristic tends to become unstable due to the positive feedback of precision cam 55 serving as a mechanical feedback device. Therefore, the transmission ratio of TCVT 10 is controlled or compensated for by way of electronic transmission ratio feedback control. The TCVT reverse ratio control system of FIG. 3 includes at least various sensors 81–87, an electronic TCVT control unit 80, and a step motor 52. Electronic TCVT control unit (TCVT controller) 80 generally comprises a microcomputer and a drive circuitry. TCVT control unit 80 includes an input/output interface (I/O), memories (RAM, ROM), and a microprocessor or a central processing unit (CPU). The input/output interface (I/O) of TCVT control unit 80 receives input information from various engine/vehicle sensors, namely an accelerator position sensor 81, a power-roller speed sensor 82, an output-disk speed sensor 83, an input-disk speed sensor 84, a tilt angle sensor 85, a trunnion displacement sensor 86, and a transmission input shaft torque sensor 87. Accelerator position sensor 81 is located near an accelerator pedal to sense or detect an accelerator-pedal depression amount APS. Actually, a rotary encoder is used as accelerator position sensor 81. Power-roller speed sensor 82 is provided to monitor or detect a power-roller speed $\omega_{pr}$ by periodically measuring a pulse signal produced in synchronism with rotation of either one of power rollers 18c, 18d, 20c, and 20d, or measuring the frequency of the pulse signal produced. Output-disk speed sensor 83 is provided to monitor or detect an output-disk speed $\omega_{od}$ by periodically measuring a pulse signal produced in synchronism with rotation of either one of output disks 18b and 21b, or measuring the frequency of the pulse signal produced. Likewise, input-disk speed sensor 84 is provided to monitor or detect an input-disk speed $\omega_{id}$ by periodically measuring a pulse signal produced in synchronism with rotation of either one of input disks 18a and 21a, or measuring the frequency of the pulse signal produced. Tilt angle sensor 85 is provided to monitor or detect a tilt angle $\phi$ of the power roller (or the trunnion). Actually, a rotary encoder is used as tilt angle sensor 85. Trunnion displacement sensor 86 is provided to monitor or detect a vertical displacement y (simply, trunnion displacement) of the trunnion from its neutral position (or a balanced point). A displacement sensor or a stroke sensor is used as trunnion displacement sensor 86. Transmission input shaft torque sensor 87 is provided to monitor or detect a transmission input torque $T_{in}$. Within TCVT control unit 80, the central processing unit (CPU) allows the access by the I/O interface of input informational data signals from the previously-discussed engine/vehicle sensors 81–87. The CPU of TCVT control unit 80 is responsible for carrying the various control programs stored in the memories and capable of performing necessary arithmetic and logic operations.

Computational results (arithmetic calculation results), that is, calculated output signals (e.g., a step-motor drive current) are relayed through the output interface circuitry having a digital-to-analog conversion function via the drive circuitry having an amplification function that amplifies an input signal from the output interface circuitry to produce a drive signal to output stages, that is, step motor 52.

Figure 4:
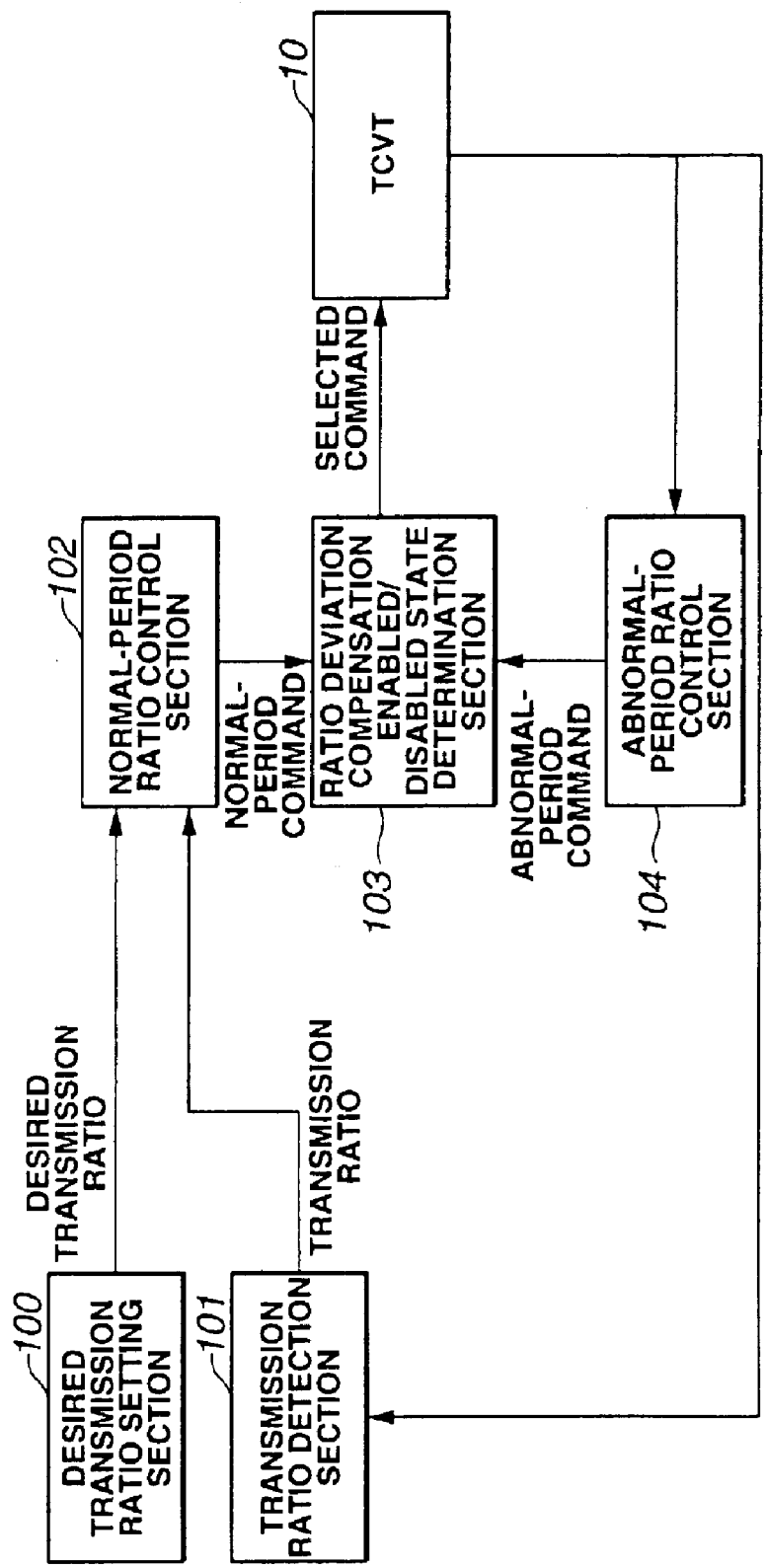
FIG. 4 is a block diagram of an electronic TCVT control unit incorporated in the TCVT reverse ratio control system shown in FIG. 3.
Figure 5:
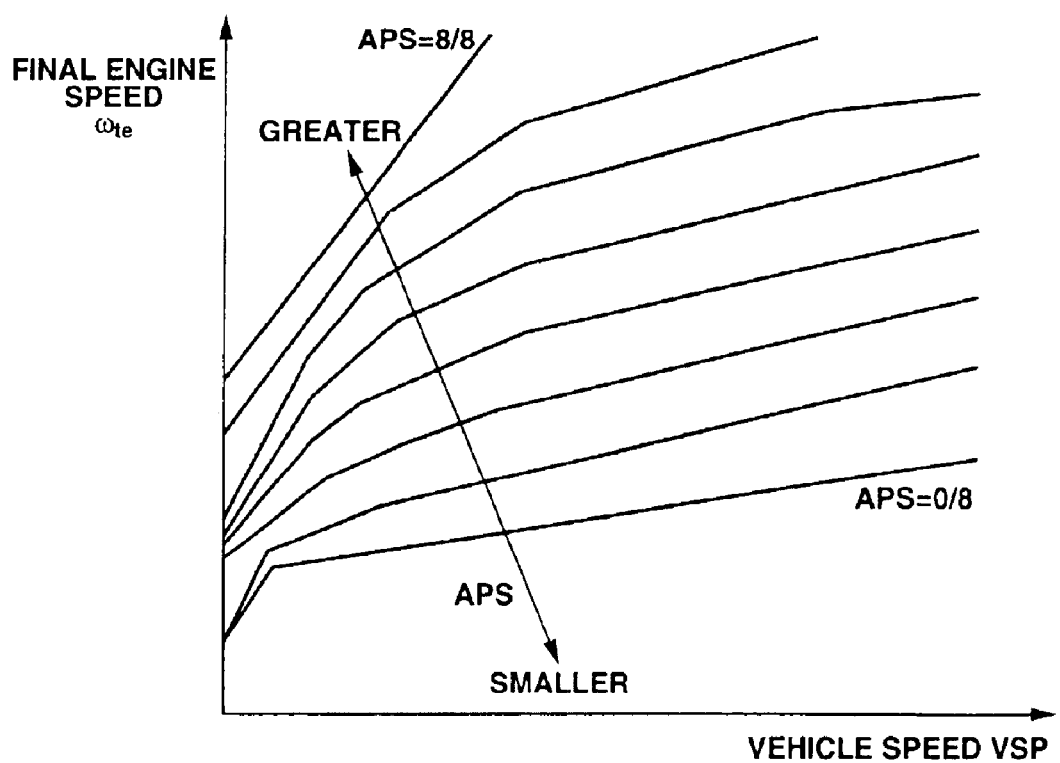
FIG. 5 is a characteristic map showing the relationship between a vehicle speed VSP and a final transmission ratio $\omega_{te}$ at various accelerator openings APS ranging from APS=0/8 to APS=8/8.

Referring now to FIG. 4, there is shown the block diagram for system operation (ratio-changing control) of electronic TCVT control unit 80 included in the first TCVT reverse ratio control system of FIG. 3. As seen from the block diagram of FIG. 4, TCVT control unit 80 included in the first TCVT reverse ratio control system is comprised of a desired transmission ratio setting section (a desired transmission ratio setting means) 100, a transmission ratio detection section (a transmission ratio detection means) 101, a normal-period ratio control section (a normal-period ratio control means) 102, a ratio deviation compensation enabled/disabled state determination section (a ratio deviation compensation enabled/disabled state determination means) 103, and an abnormal-period ratio control section (an abnormal-period ratio control means) 104. Desired transmission ratio setting section 100 arithmetically calculates or estimates or sets a desired transmission ratio G* based on both vehicle speed VSP and accelerator depression amount APS. More concretely, a final engine speed $\omega_{te}$ is, first of all, retrieved based on vehicle speed VSP and accelerator depression amount APS from a predetermined or preprogrammed VSP-APS-$\omega_{te}$ characteristic map of FIG. 5 showing how final engine speed $\omega_{te}$ has to be varied relative to vehicle speed VSP and accelerator depression amount APS. Vehicle speed VSP is estimated or arithmetically calculated based on output-disk speed $\omega_{od}$ from the following expression (1).

$$VSP = k_v \omega_{od} \tag{1}$$

where $k_v$ is a predetermined constant that is determined based on a final reduction gear ratio and a radius of a tire of the vehicle employing TCVT 10.

Second, a final TCVT transmission ratio $G_t$ is estimated or arithmetically calculated based on final engine speed $\omega_{te}$ and output-disk speed $\omega_{od}$ from the following expression (2).

$$G_t = \omega_{te}/\omega_{od} \tag{2}$$

Finally, desired transmission ratio G* is arithmetically calculated or estimated based on final TCVT transmission ratio $G_t$ from the following expression (3) that corresponds to a low-pass filter.

$$\dot{G}^* = \frac{dG^*}{dt} = -c_r G^* + c_r G_t \tag{3}$$

where $c_r$ is a predetermined constant corresponding to a time constant that reflects a better shift feel, a better driveability and the like.

Transmission ratio detection section 101 arithmetically calculates or estimates or detects an actual transmission ratio (simply, a transmission ratio) G based on input-disk speed $\omega_{id}$ and output-disk speed $\omega_{od}$ from the following expression (4), for example.

$$G = \omega_{id}/\omega_{od} \tag{4}$$

In this manner, transmission ratio G is estimated or represented as a function $G = f(\omega_{id}, \omega_{od})$ of input-disk speed $\omega_{id}$ and output-disk speed $\omega_{od}$.

In lieu thereof, transmission ratio G is estimated or represented as a function $G = f(\phi)$ of tilt angle $\phi$, as hereunder described (see a relational expression (5) described later). Alternatively, transmission ratio G is estimated or represented as a function $G = f(\phi, \omega_{pr})$ of tilt angle $\phi$ and power-roller speed $\omega_{pr}$, as hereunder described in detail (see relational expressions (6) and (7) described later).

There is the following relationship between transmission ratio G and tilt angle $\phi$ (see the following relational expression (5)).

$$G = \frac{1 + \eta - \cos(2\theta - \phi)}{1 + \eta - \cos(\phi)} \tag{5}$$

where two constants $\eta$ and $\theta$ are determined depending on mechanical specifications of TCVT 10.

Also, there is the following relationship among input-disk speed $\omega_{id}$, power-roller speed $\omega_{pr}$, and tilt angle $\phi$ (see the following relational expression (6)).

$$\omega_{id} = \frac{\sin(\theta)}{1 + \eta - \cos(\phi)} \omega_{pr} \tag{6}$$

Additionally, there is the following relationship among output-disk speed $\omega_{od}$, power-roller speed $\omega_{pr}$, and tilt angle $\phi$ (see the following relational expression (7)).

$$\omega_{od} = \frac{\sin(\theta)}{1 + \eta - \cos(2\theta - \phi)} \omega_{pr} \tag{7}$$

From the aforesaid two relational expressions (6) and (7), output-disk speed $\omega_{od}$ and input-disk speed $\omega_{id}$ are arithmetically calculated based on power-roller speed $\omega_{pr}$ and tilt angle $\phi$ both detected by the respective sensors 82 and 85. Thereafter, from the previously-described expression (4), transmission ratio G can be calculated based on the output-disk speed $\omega_{od}$ and input-disk speed $\omega_{id}$, both arithmetically calculated based on power-roller speed $\omega_{pr}$ and tilt angle $\phi$.

Figure 11:
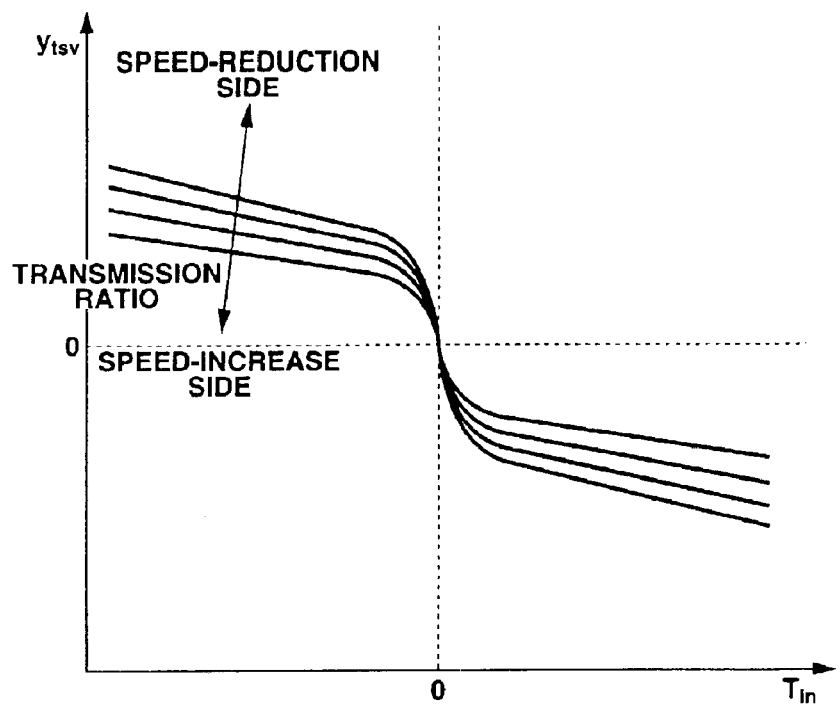
FIG. 11 is a characteristic map showing the relationship between an input shaft torque $T_{in}$ and a first trunnion displacement error $y_{tsv}$ at various transmission ratios.
Figure 12:
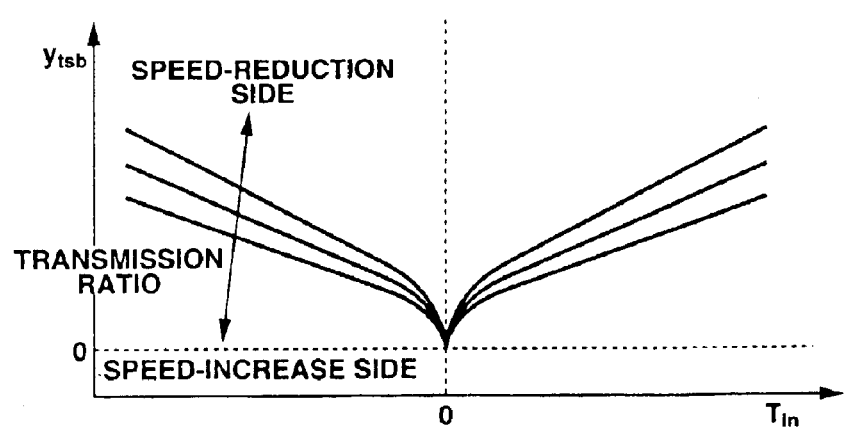
FIG. 12 is a characteristic map showing the relationship between an input shaft torque $T_{in}$ and a second trunnion displacement error $y_{tsb}$ at various transmission ratios.

Normal-period ratio control section 102 receives both desired transmission ratio G* and transmission ratio G, and generates a normal-period step-motor driving command signal based on a deviation between desired transmission ratio G* and transmission ratio G and suited to a normal state that the transmission ratio is detectable or estimatable, so that the actual transmission ratio is brought closer to the desired value. More concretely, on the assumption that a displacement u of step motor 52 is an input, and trunnion displacement y and tilt angle $\phi$ are state variables, a dynamic characteristic of TCVT 10 (exactly, the TCVT control system) is represented by the following two expressions (8) and (9).

$$\frac{d\phi}{dt} = f(\phi, \omega_{od})(y - y_{tsv}) \tag{8}$$

$$\frac{dy}{dt} = g\{-a_1(\phi - \phi_0) - a_2(y - y_{tsb}) + b(u - u_0)\} \tag{9}$$

where f is a nonlinear function of tilt angle $\phi$ and output-disk speed $\omega_{od}$, three constants $a_1$, $a_2$, and b are determined depending on mechanical specifications of TCVT 10, g is a valve gain of the ratio control valve, $\phi_0$ is a reference tilt angle, $u_0$ is a reference displacement of step motor 52, $y_{tsv}$ and $y_{tsb}$ are first and second trunnion displacement errors occurring owing to the looseness between the trunnion and the power roller and deformation (containing a so-called torque shift occurring due to input torque) of the trunnion during operation of the TCVT, first trunnion displacement error $y_{tsv}$ is retrieved from a predetermined transmission ratio G versus input shaft torque $T_{in}$ versus 1st trunnion displacement error $y_{tsv}$ characteristic map shown in FIG. 11, second trunnion displacement error $y_{tsb}$ is retrieved from a predetermined transmission ratio G versus input shaft torque $T_{in}$ versus 2nd trunnion displacement error $y_{tsb}$ characteristic map shown in FIG. 12, and the difference $(y - y_{tsv})$ means an offset of the power roller from the common rotation center of input and output disks. The nonlinear function f($\phi$, $\omega_{od}$) is represented by the following expression (10).

$$f = \frac{\cos(\theta - \phi)\cos(2\theta - \phi)}{f_d} \omega_{od} \quad (10)$$

where fd is a constant that is determined depending on the shape of TCVT 10.

On the assumption that an output of the TCVT control system having the dynamic characteristic defined by the aforementioned expressions (8) and (9) is the tilt angle $\phi$, the TCVT control system is a controllable and observable system. In this case, it is possible to stabilize the power-roller tilt angle $\phi$ (that is, the transmission ratio) by feedback-controlling the state variable. For instance, a PID controller with three terms, represented by the following expression (11), may be used as a feedback controller, so that the control characteristic of the transmission ratio with respect to the desired transmission ratio can be effectively stabilized.

$$u = \left(k_P + k_D s + \frac{k_I}{s}\right)(G^* - G) \quad (11)$$

where $k_P$ is an adjustable control gain for a proportional term, $k_D$ is an adjustable control gain for a differentiating term, $k_I$ is an adjustable control gain for an integrating term, and s is a Laplace operator or a Laplacean.

Abnormal-period ratio control section 104 generates an abnormal-period step-motor driving command signal that TCVT 10 is shifted to a low gear ratio (a speed-reduction side), while keeping trunnion 23 out of contact with its stopper during vertical displacement of the trunnion, when the electronic TCVT control system is in an abnormal state that transmission ratio G cannot be detected or estimated. For example, the abnormal state corresponds to the following conditions that it is impossible to satisfactorily stabilize or compensate for the transmission ratio by means of normal-period ratio control section 102:

(i) 1st condition where the transmission ratio cannot be detected or estimated owing to a sensor failure of at least one of output-disk speed sensor 83 and input-disk speed sensor 84 or a sensor system failure such as a breakage in the sensor system signal line; and (ii) 2nd condition where a step-motor driving speed is low when the TCVT is still cold and thus the working-fluid temperature is very low in cold weather.

In TCVT 10, the sign of nonlinear function f($\phi$, $\omega_{od}$) of the aforementioned expression (10) changes depending on the sign of output-disk speed $\omega_{od}$, which is plus in the forward operating mode and minus in the reverse operating mode. Additionally, the sign of d$\phi$/dt of the expression (8) also changes depending on whether the current shifting operation progresses to the forward side or to the reverse side. From the sign of nonlinear function f($\phi$, $\omega_{od}$), the sign of d$\phi$/dt, and the expression (8), i.e., d$\phi$/dt=f($\phi$, $\omega_{od}$)(y-$y_{tsv}$), the sign of power-roller offset (y-$y_{tsv}$) can be determined. For instance, when shifting the transmission ratio of TCVT 10 toward a low gear ratio (a speed-reduction side) during the reverse operating mode, the sign of nonlinear function f($\phi$, $\omega_{od}$) is defined by the following inequality (19), the sign of d$\phi$/dt is defined by the following inequality (13).

$$f < 0 \quad (12)$$

$$\frac{d\phi}{dt} < 0 \quad (13)$$

Thus, the sign of power-roller offset (y-$y_{tsv}$) becomes positive, as indicated by the following inequality (14).

$$y - y_{tsv} > 0 \quad (14)$$

From the expression (9), a steady-state displacement $y_s$ of trunnion displacement y is represented by the following expression (15), because in a steady state the conditions at each point do not change with time and thus the time rate of change dy/dt of trunnion displacement y is "0".

$$\frac{dy}{dt} = 0 = g\{-a_1(\phi - \phi_0) - a_2(y - y_{tsb}) + b(u - u_0)\} \quad (15)$$

$$a_2(y - y_{tsb}) = -a_1(\phi - \phi_0) + b(u - u_0)$$

$$y_s = \frac{-a_1(\phi - \phi_0) + b(u - u_0)}{a_2} + y_{tsb}$$

An area of step-motor displacement u that steady-state trunnion displacement $y_s$ of the above expression (15) satisfies trunnion displacementy of the expression (14), is represented by the following inequality (16) from the previously-noted inequality (14) and expression (15).

$$\frac{-a_1(\phi - \phi_0) + b(u - u_0)}{a_2} + y_{tsb} - y_{tsv} > 0 \quad (16)$$

$$\frac{-a_1(\phi - \phi_0) - a_2(y_{tsv} - y_{tsb})}{b} + u - u_0 > 0$$

$$u > \frac{a_1(\phi - \phi_0) + a_2(y_{tsv} - y_{tsb})}{b} + u_0$$

The area defined by the inequality (16) corresponds to an area of step-motor displacement u that diverges to a low gear ratio (a speed-reduction side).

On the assumption that first and second trunnion displacement errors $y_{tsv}$ and $y_{tsb}$ of the inequality (16) are both "0", the following inequality (17) is obtained.

$$u > \frac{a_1(\phi - \phi_0)}{b} + u_0 \quad (17)$$

Figure 6:
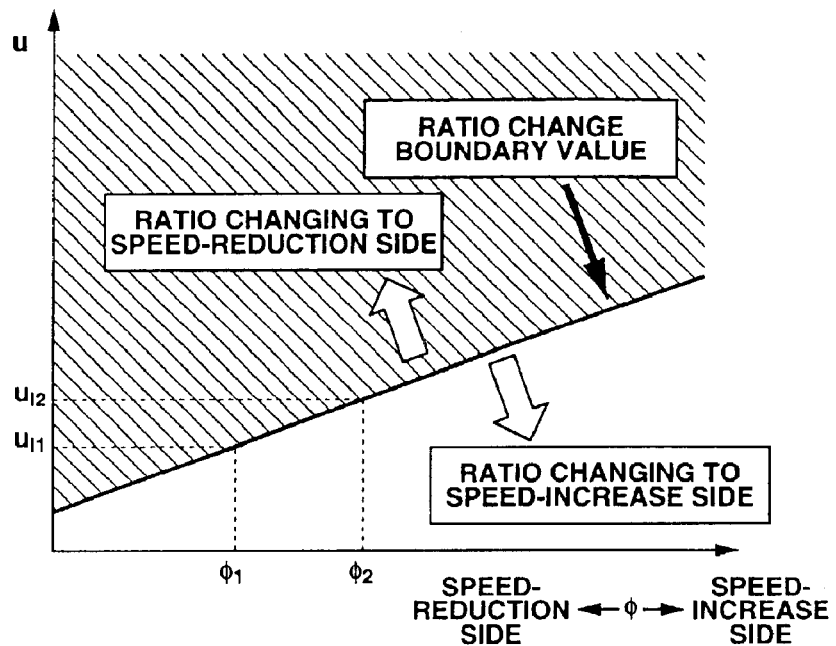
FIG. 6 is a diagram illustrating a ratio control actuator area (a hatched area) within which the TCVT of the embodiment diverges toward the speed-reduction side (low ratio).

The hatched area shown in FIG. 6 corresponds to the area of step-motor displacement u (as defined by the above inequality (17)) that diverges to the speed-reduction side (low ratio). A high-to-low ratio change boundary value (simply, a ratio change boundary value) shown in FIG. 6 corresponds to the right-hand side of the inequality (17), i.e., $$\frac{a_1(\phi - \phi_0)}{b} + u_0,$$

which is equivalent to the step-motor displacement that the vertical offset of each of power rollers 18*c*, 18*d,* 20*c,* and 20*d* is "0". The ratio change boundary value of FIG. 6, defined by $$\frac{a_1(\phi - \phi_0)}{b} + u_0,$$

forms the boundary of the direction of ratio changing. This is because a change in the direction of offset of the power roller from the common rotation center of input and output disks occurs at the ratio change boundary value of FIG. 6.

On the other hand, the necessary condition that the trunnion is kept out of contact with its stopper during the vertical displacement (the vertical offset) of the trunnion is represented by the following expression (18).

$$\Delta y > y \qquad (18)$$

where $\Delta y$ is a piston stroke of servo piston 51 (see a piston traveled distance denoted by $\Delta y$ in FIG. 2). An area of step-motor displacement u that steady-state trunnion displacement $y_s$ defined by the expression (15) satisfies trunnion displacement y defined by the inequality (18), is represented by the following inequality (19) from the previously-noted expression (15) and inequality (18).

$$\Delta y > \frac{-a_1(\phi - \phi_0) + b(u - u_0)}{a_2} + y_{tsb} \qquad (19)$$

$$\frac{a_1(\phi - \phi_0) + a_2(\Delta y - y_{tsb})}{b} > u - u_0$$

$$u < \frac{a_1(\phi - \phi_0) + a_2(\Delta y - y_{tsb})}{b} + u_0$$

The area defined by the inequality (19) corresponds to an area of step-motor displacement u that the trunnion is kept out of contact with its stopper during the vertical displacement (the vertical offset) of the trunnion. On the assumption that second trunnion displacement error $y_{tsb}$ of the inequality (19) is "0", the following inequality (20) is obtained.

$$u < \frac{a_1(\phi - \phi_0) + a_2 \Delta y}{b} + u_0 \qquad (20)$$

Figure 7:
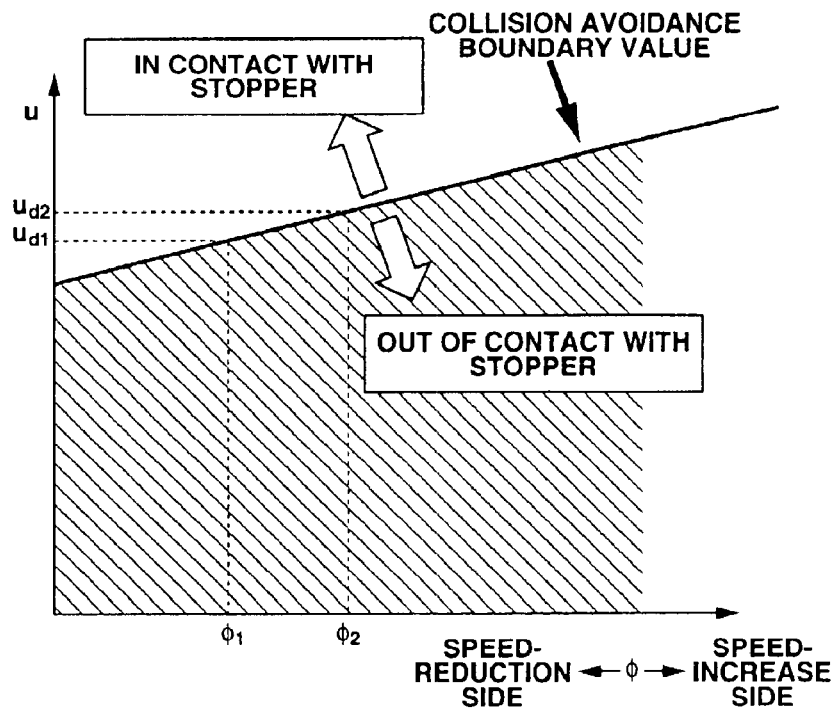
FIG. 7 is a diagram illustrating a ratio control actuator area (a hatched area) within which a trunnion of the TCVT of the embodiment is out of contact with its stopper.

The hatched area shown in FIG. 7 corresponds to the area of step-motor displacement u (defined by the above inequality (20)) that the trunnion is kept out of contact with its stopper during the vertical displacement (the vertical offset) of the trunnion. A collision avoidance boundary value shown in FIG. 7 corresponds to the right-hand side of the inequality (20), i.e., $$\frac{a_1(\phi - \phi_0) + a_2 \Delta y}{b} + u_0.$$

The intersection of the conditions defined by the previously-noted inequalities (17) and (20) is represented by the following inequality (21).

$$\frac{a_1(\phi - \phi_0)}{b} + u_0 < u < \frac{a_1(\phi - \phi_0) + a_2 \Delta y}{b} + u_0 \qquad (21)$$

Figure 8:
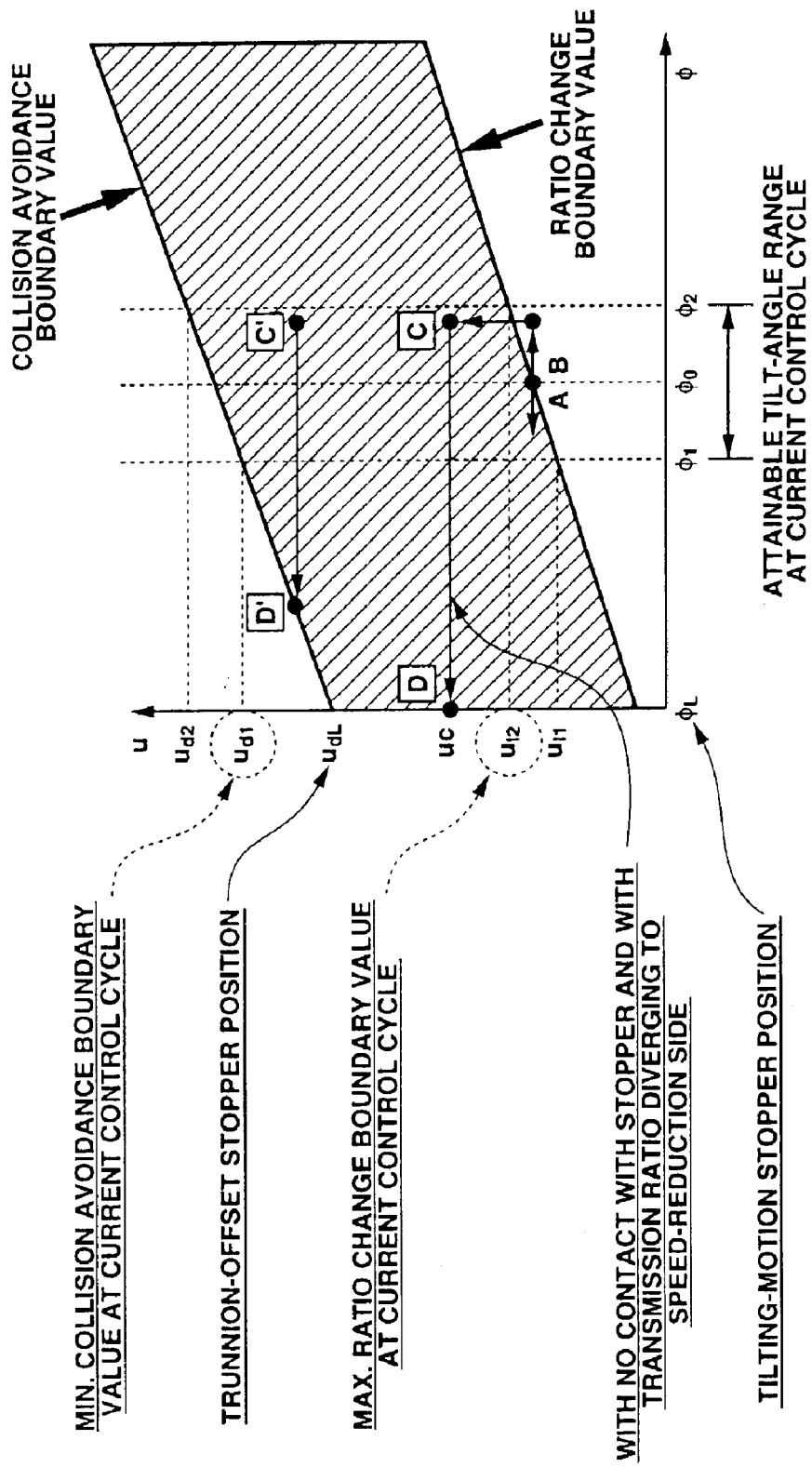
FIG. 8 is a diagram illustrating a ratio control actuator area (a hatched area) within which the TCVT of the embodiment diverges toward the speed-reduction side (low ratio) and additionally the trunnion is out of contact with its stopper.

The hatched area shown in FIG. 8 corresponds to the area of step-motor displacement u (defined by the above inequality (21) satisfying both the expressions (17) and (20)) that the transmission ratio is shifted or diverged to the speed-reduction side (low ratio) and that the trunnion is kept out of contact with its stopper during the vertical displacement (the vertical offset) of the trunnion. As discussed above, when the electronic TCVT control system is in the abnormal state that the transmission ratio cannot be detected or estimated, abnormal-period ratio control section 104 may generate an abnormal-period step-motor driving command signal that satisfies the condition defined by the inequality (21), so as to shift or diverge the transmission ratio to the speed-reduction side (low ratio) and additionally to prevent or avoid the trunnion from being brought into collision-contact with its stopper during the vertical displacement (the vertical offset) of the trunnion. Instead of using the abnormal-period step-motor driving command signal satisfying the condition defined by the inequality (21), an anticipating correction signal, in which the transmission ratio is shifted or diverged to the speed-reduction side (low ratio) and additionally the trunnion is prevented or avoided from being brought into collision-contact with its stopper during the vertical displacement (the vertical offset) of the trunnion, may be used as the abnormal-period step-motor driving command signal. In this case, the anticipating correction signal value has to be experimentally determined in advance.

Returning to the block diagram of FIG. 4, ratio deviation compensation enabled/disabled state determination section 103 determines whether or not the deviation of transmission ratio G from desired transmission ratio G* can be compensated for. For example, ratio deviation compensation enabled/disabled state determination section 103 determines that the deviation of transmission ratio G from desired transmission ratio G* can be compensated for, when the electronic TCVT control system is in the normal state that the transmission ratio is detectable or estimatable. In other words, ratio deviation compensation enabled/disabled state determination section 103 determines that the deviation of transmission ratio G from desired transmission ratio G* cannot be compensated for, when the electronic TCVT control system is in the abnormal state that the transmission ratio cannot be detected or estimated. During the normal state in which the deviation of transmission ratio G from desired transmission ratio G* can be compensated for, ratio deviation compensation enabled/disabled state determination section 103 outputs the normal-period step-motor driving command signal from normal-period ratio control section 102 to step motor 52 of TCVT 10. Conversely during the abnormal state in which the deviation of transmission ratio G from desired transmission ratio G* cannot be compensated for, ratio deviation compensation enabled/disabled state determination section 103 outputs the abnormal-period step-motor driving command signal from abnormal-period ratio control section 104 to step motor 52 of TCVT 10.

Figure 9:
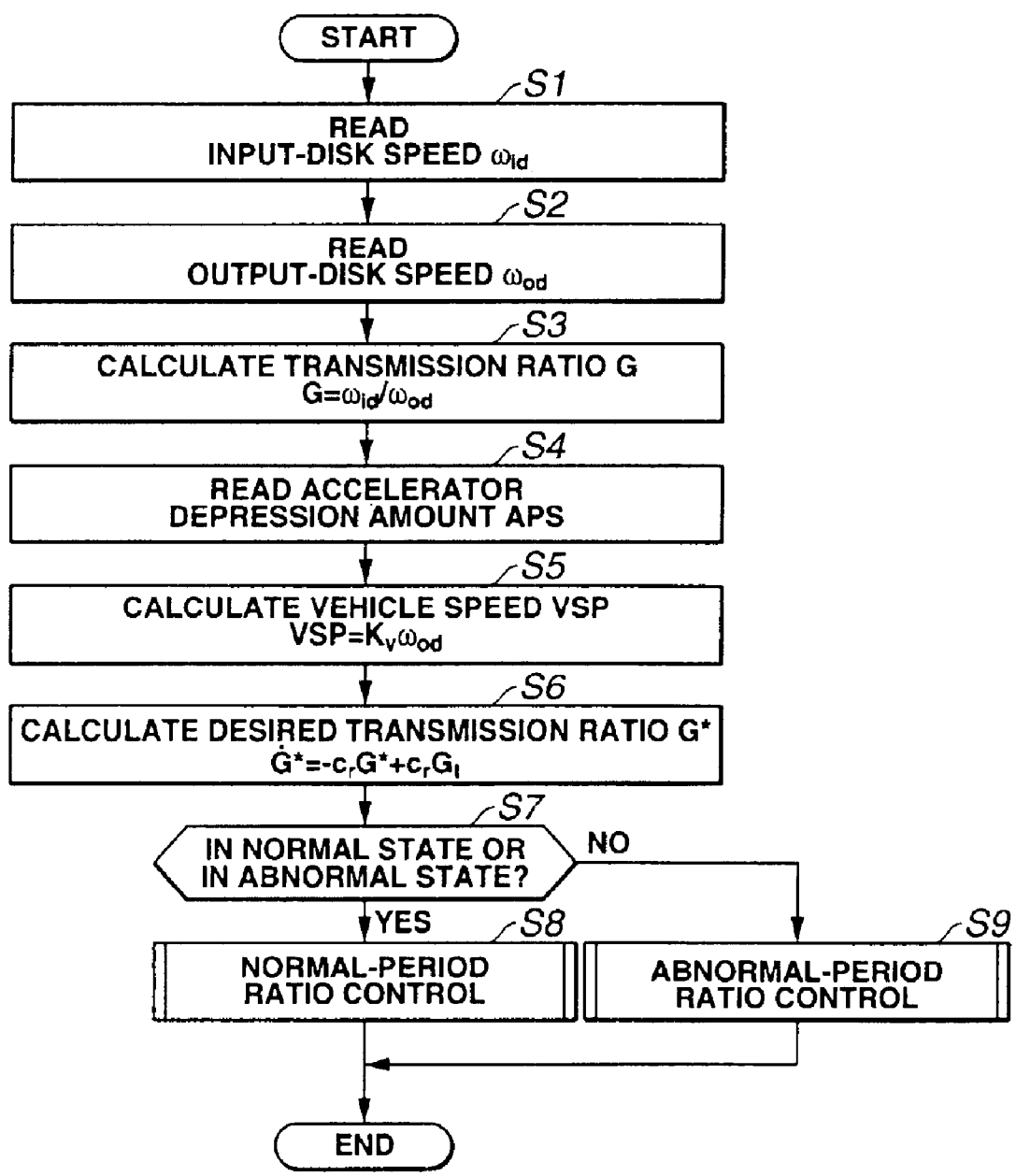
FIG. 9 is a flow chart illustrating a control routine executed by the TCVT reverse ratio control system shown in FIGS. 3 and 4.

Referring now to FIG. 9, there is shown the control routine executed within electronic TCVT control unit 80 of the first TCVT reverse ratio control system of FIGS. 3 and 4. The control routine of FIG. 9 is executed as time-triggered interrupt routines to be triggered every predetermined sampling time intervals such as 20 milliseconds.

At step S1, input-disk speed $\omega_{id}$, detected by input-disk speed sensor 84, is read.

At step S2, output-disk speed $\omega_{od}$, detected by output-disk speed sensor 83, is read.

At step S3, transmission ratio G is arithmetically calculated as the ratio $\omega_{id}/\omega_{od}$ of input-disk speed $\omega_{id}$ to output-disk speed $\omega_{od}$, from the expression (4), that is, $G = \omega_{id}/\omega_{od}$.

At step S4, accelerator-pedal depression amount APS, detected by accelerator position sensor 81, is read.

At step S5, vehicle speed VSP is arithmetically calculated based on output-disk speed $\omega_{od}$ from the expression (1), that is, $VSP = k_v \omega_{od}$.

At step S6, first, final engine speed $\omega_{te}$ is map-retrieved based on vehicle speed VSP and accelerator depression amount APS from a predetermined or preprogrammed VSP–APS–$\omega_{te}$ characteristic map of FIG. 5. Second, final TCVT transmission ratio $G_t$ is arithmetically calculated based on final engine speed $\omega_{te}$ and output-disk speed $\omega_{od}$ from the expression (2), that is, $G_t = \omega_{te}/\omega_{od}$. And then, desired transmission ratio G* is arithmetically calculated based on final TCVT transmission ratio $G_t$ by way of the low-pass filter defined by the expression (3), that is, $$\dot{G}^* = \frac{dG^*}{dt} = -c_r G^* + c_r G_t.$$

At step S7, a check is made to determine whether the electronic TCVT control system is in the normal state or in the abnormal state. When the answer to step S7 is in the affirmative (YES), that is, when the electronic TCVT control system is in the normal state that the transmission ratio is detectable or estimatable, the routine proceeds from step S7 to step S8. Conversely when the answer to step S7 is in the negative (NO), that is, when the electronic TCVT control system is in the abnormal state that the transmission ratio cannot be detected or estimated, the routine proceeds from step S7 to step S9.

At step S8, the normal-period step-motor driving command signal value corresponding to a step-motor displacement u suited to the normal state that the transmission ratio is detectable or estimatable, is arithmetically calculated based on desired transmission ratio G* and transmission ratio G by way of the PID controller defined by the expression (11), that is, $$u = \left(k_P + k_D s + \frac{k_I}{s}\right)(G^* - G).$$

At step S9, the anticipating correction signal value that the transmission ratio is shifted or diverged to the speed-reduction side (low ratio) and additionally the trunnion is prevented or avoided from being brought into collision-contact with its stopper during the vertical displacement of trunnion 23, is set or determined as the abnormal-period step-motor driving command signal value suited to the abnormal state that the transmission ratio cannot be detected or estimated.

In the control routine shown in FIG. 9, steps S1–S3 are related to transmission ratio detection section 101 of FIG. 4, steps S4–S6 are related to desired transmission ratio setting section 100, step S7 is related to ratio deviation compensation enabled/disabled state determination section 103, step S8 is related to normal-period ratio control section 102, and step S9 is related to abnormal-period ratio control section 104.

As discussed above, according to the first TCVT reverse ratio control system (see FIGS. 3, 4 and 9) of the TCVT control apparatus of the embodiment, it is possible to achieve a desirable ratio control state that the transmission ratio of TCVT 10 is shifted or diverged to the speed-reduction side (low ratio) and additionally the trunnion is prevented or avoided from being brought into collision-contact with its stopper (for example, a cylinder block of servo piston 51) in the reverse operating mode, by optimally setting a step-motor driving command signal value corresponding to step-motor displacement u irrespective of whether the electronic TCVT control system is in the normal state or in the abnormal state. That is to say, according to the reverse ratio control system (see FIGS. 3, 4 and 9) of the TCVT control apparatus of the embodiment, it is possible to certainly realize a so-called "low-ratio starting" in the reverse operating mode. Additionally, it is possible to effectively suppress or prevent undesired wear and heat generation in the very limited contact zone and to enhance the durability of the TCVT by certainly reliably avoiding undesired collision-contact between the trunnion and its stopper.

Figure 10:
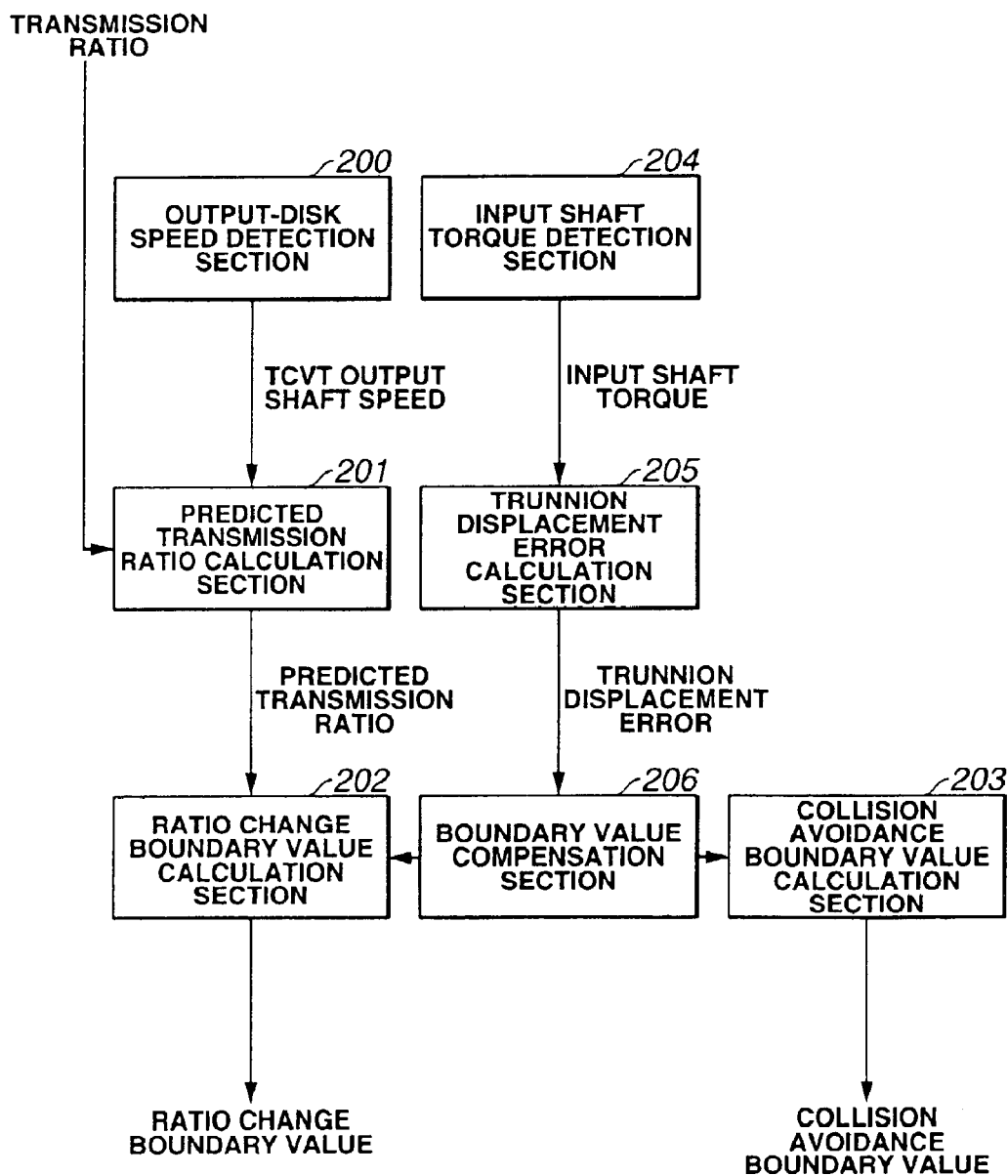
FIG. 10 is a block diagram illustrating the detailed construction of an abnormal-period ratio control section of the electronic TCVT control unit incorporated in the TCVT reverse ratio control system of the embodiment.

Referring now to FIG. 10, there is shown the block diagram illustrating the detailed construction of abnormal-period ratio control section 104 of electronic TCVT control unit 80 shown in FIGS. 3 and 4. As shown in FIG. 10, abnormal-period ratio control section 104 is comprised of an output-disk speed detection section (an output-disk speed detection means) 200, a predicted transmission ratio calculation section (a predicted transmission ratio calculation means) 201, a ratio change boundary value calculation section (a ratio change boundary value calculation means) 202, a collision avoidance boundary value calculation section (a collision avoidance boundary value calculation means) 203, an input shaft torque detection section (an input shaft torque detection means) 204, a trunnion displacement error calculation section (a trunnion displacement error calculation means) 205, and a boundary value compensation section (a boundary value compensation means) 206. Output-disk speed detection section 200 detects or estimates rotational speed transmitted and inputted to the output disk, in other words, a transmission output shaft speed of TCVT 10.

Predicted transmission ratio calculation section 201 serves to predict or estimate a tilt angle at a current control cycle (simply, a predicted tilt angle $\phi_2$) based on output-disk speed $\omega_{od}$ and a tilt angle $\phi_p$ detected by tilt angle sensor 85 just before a transition from a state wherein the transmission ratio can be detected to a state wherein the transmission ratio cannot be detected takes place, on the assumption that the transmission ratio shifts or diverges to the highest ratio (of the speed-increase side) given or estimated at the present time at a maximum ratio-changing speed. As can be appreciated from the expression (8), that is, $d\phi/dt = f(\phi, \omega_{od})(y - y_{tsv})$, the time rate of change in tilt angle $\phi$, i.e., a tilting velocity $d\phi/dt$ (in other words, a ratio-changing speed) tends to increase, as the absolute value $|y|$ of trunnion displacement y increases. The maximum value of the absolute value $|y|$ of trunnion displacement y is determined by the maximum offset of the power-roller rotation axis from the common rotation axis of the input and output disks, that is, when the power roller (or the trunnion) is held in contact with its stopper. Assuming that the distance from a zero offset position of the power roller to a maximum offset position (corresponding to the stopper position at the speed-increase side) is identical to piston stroke $\Delta y$ of servo piston 51 shown in FIG. 2, a maximum value $\Delta \phi_n$ of the ratio-changing speed (in other words, the tilting speed $d\phi/dt$) toward the speed-increase side (high ratio) is represented by the following expression (22).

$$\Delta\phi_h = -f(\phi_p, \omega_{od})\Delta y \quad (22)$$

Additionally, assuming that a time period from (i) the time of detection of tilt angle $\phi_p$ just before the transition from a state wherein the transmission ratio can be detected to a state wherein the transmission ratio cannot be detected takes place to (ii) the present time (the current control cycle) is denoted by "T", predicted tilt angle (in other words, a predicted transmission ratio at the current control cycle) $\phi_2$ is represented by the following expression (23).

$$\phi_2 = \phi_p + T\Delta\phi_n \quad (23)$$

Ratio change boundary value calculation section 202 calculates a ratio change boundary value $u_1$ assuming that the previously-discussed predicted transmission ratio (in other words, the predicted tilt angle) $\phi_2$ is equivalent to the transmission ratio. Ratio change boundary value $u_1$ is represented by the following expression (24), since ratio change boundary value $u_1$ corresponds to the right-hand side of the inequality (17), i.e., $$\frac{a_1(\phi - \phi_0)}{b} + u_0,$$

which is equivalent to the step-motor displacement at the power-roller zero offset position.

$$u_1 = \frac{a_1(\phi - \phi_0)}{b} + u_0 \qquad (24)$$

As appreciated from the diagram of FIG. 6, the hatched area of step-motor displacement u that diverges to the speed-reduction side (low ratio) varies depending on the magnitude of power-roller tilt angle φ. As seen from the diagram of FIG. 6, the hatched area of step-motor displacement u, diverging to the speed-reduction side (low ratio), tends to narrow, as tilt angle φ changes to the speed-increase side (high ratio). At the present time when the electronic TCVT control system is in the abnormal state, transmission ratio G cannot be detected or estimated. Thus, the area of step-motor displacement u that diverges to the speed-reduction side (low ratio) and becomes narrowest at this time can be computed or calculated by utilizing the previously-discussed predicted transmission ratio (in other words, the predicted tilt angle) $\phi_2$, estimated by predicted transmission ratio calculation section 201. By making a substitution $\phi=\phi_2$ with respect to the previously-discussed inequality (17), it is possible to obtain the following inequality (25).

$$u > \frac{a_1(\phi_2 - \phi_0)}{b} + u_0 \qquad (25)$$

Ratio change boundary value $u_{12}$ at the present time is represented by the following expression (26), by making a substitution $\phi=\phi_2$ with respect to the inequality (24).

$$u_{12} = \frac{a_1(\phi_2 - \phi_0)}{b} + u_0 \qquad (26)$$

By properly setting step-motor displacement u within the area defined by the above-mentioned inequality (25), it is possible to more accurately compute or calculate the area of step-motor displacement u capable of certainly shifting or diverging the transmission ratio to the speed-reduction side (low ratio) at the current control cycle (at the present time) at which the electronic TCVT control system is in the abnormal state that transmission ratio G cannot be detected or estimated.

Collision avoidance boundary value calculation section 203 calculates a collision avoidance boundary value $u_d$. Collision avoidance boundary value $u_d$ is represented by the following expression (27), since collision avoidance boundary value $u_d$ corresponds to the right-hand side of the inequality (20).

$$u_d = \frac{a_1(\phi - \phi_0) + a_2 \Delta y}{b} + u_0 \qquad (27)$$

As appreciated from the diagram of FIG. 7, the hatched area of step-motor displacement u that the trunnion is kept out of contact with its stopper during the vertical displacement (the vertical offset) varies depending on the magnitude of power-roller tilt angle φ. As seen from the diagram of FIG. 7, the hatched area of step-motor displacement u that the trunnion is kept out of contact with its stopper during the vertical displacement (the vertical offset) tends to narrow, as tilt angle φ changes to the speed-reduction side (low ratio). Thus, on the assumption that the current power-roller tilt angle φ is identical to a minimum value $\phi_L$ (corresponding to the tilting-motion stopper position of the speed-reduction side) at the current control cycle, by making a substitution $\phi=\phi_L$, with respect to the previously-discussed inequality (20), it is possible to obtain the following inequality (28).

$$u < \frac{a_1(\phi_L - \phi_0) + a_2 \Delta y}{b} + u_0 \qquad (28)$$

Collision avoidance boundary value $u_{dL}$ at the present time is represented by the following expression (29), by making a substitution $\phi=\phi_L$, with respect to the inequality (27).

$$u_{dL} = \frac{a_1(\phi_L - \phi_0) + a_2 \Delta y}{b} + u_0 \qquad (29)$$

By properly setting step-motor displacement u within the area defined by the above-mentioned inequality (28), it is possible to more accurately calculate the area of step-motor displacement u capable of preventing or avoiding the trunnion from being brought into contact with its stopper during the vertical displacement (the vertical offset) even when the electronic TCVT control system is in the abnormal state that transmission ratio G cannot be detected or estimated.

Input shaft torque detection section 204 detects or estimates input shaft torque $T_{in}$ acting on the input disk of TCVT 10. As previously described, the torque input into the TCVT input disk may be detected or sensed directly by means of transmission input shaft torque sensor 87 attached to the TCVT input shaft.

Trunnion displacement error calculation section 205 calculates first trunnion displacement error $y_{tsv}$ based on the current transmission ratio and input shaft torque $T_{in}$ from the predetermined G–$T_{in}$–$y_{tsv}$ characteristic map shown in FIG. 11 showing how first trunnion displacement error $y_{tsv}$ has to be varied relative to both the transmission ratio G and input shaft torque $T_{in}$. Trunnion displacement error calculation section 205 also calculates second trunnion displacement error $y_{tsb}$ based on the current transmission ratio and input shaft torque $T_{in}$ from the predetermined G–$T_{in}$–$y_{tsb}$ characteristic map shown in FIG. 12 showing how second trunnion displacement error $y_{tsb}$ has to be varied relative to both the transmission ratio G and input shaft torque $T_{in}$.

Boundary value compensation section 206 compensates for the previously-noted ratio change boundary value and the collision avoidance boundary value based on first and second trunnion displacement errors $y_{tsv}$ and $y_{tsb}$. Concretely, compensation for both the ratio change boundary value and the collision avoidance boundary value is made as follows:

First, note that the ratio change boundary value $u_{12}$ defined by the previously-noted expression (26) is obtained on the assumption that first and second trunnion displacement errors $y_{tsv}$ and $y_{tsb}$ are both zero. The condition that the transmission ratio shifts or diverges to the speed-reduction side (low ratio) is represented by the following inequality (30) by making a substitution $\phi=\phi_2$ with respect to the inequality (16) taking into account the presence of first and second trunnion displacement errors $y_{tsv}$ and $y_{tsb}$.

$$u > \frac{a_1(\phi_2 - \phi_0) + a_2(y_{tsv} - y_{tsb})}{b} + u_0 \quad (30)$$

A ratio change boundary value $u'_{12}$ at the current control cycle (at the present time) is represented by the following expression (31), since ratio change boundary value $u'_{12}$ corresponds to the right-hand side of the inequality (30).

$$u'_{12} = \frac{a_1(\phi_2 - \phi_0)}{b} + u_0 + \frac{a_2(y_{tsv} - y_{tsb})}{b} \quad (31)$$

As seen from the expression (31), ratio change boundary value $u'_{12}$ is obtained as a sum of ratio change boundary value $$u_{12}\left( = \frac{a_1(\phi_2 - \phi_0)}{b} + u_0 \right)$$

of the expression (26) and a correction term of the trunnion displacement errors $y_{tsv}$ and $y_{tsb}$, that is, $$\frac{a_2(y_{tsv} - y_{tsb})}{b}.$$

Second, note that the collision avoidance boundary value $u_{dL}$ defined by the expression (29) is also obtained on the assumption that first and second trunnion displacement errors $y_{tsv}$ and $y_{tsb}$ are both zero. The necessary condition that the trunnion is not brought into collision-contact with its stopper during the vertical displacement of the trunnion is represented by the following inequality (32) by making a substitution $\phi=\phi_2$ with respect to the inequality (19) taking into account the presence of first and second trunnion displacement errors $y_{tsv}$ and $y_{tsb}$.

$$u < \frac{a_1(\phi_L - \phi_0) + a_2(\Delta y - y_{tsb})}{b} + u_0 \quad (32)$$

A collision avoidance boundary value $u'_{dL}$ at the current control cycle is represented by the following expression (33), since collision avoidance boundary value $u'_{dL}$ corresponds to the right-hand side of the inequality (32).

$$u'_{dL} = \frac{a_1(\phi_2 - \phi_0) + a_2 \Delta y}{b} + u_0 - \frac{y_{tsb}}{b} \quad (33)$$

As seen from the above expression (33), collision avoidance boundary value $u'_{dL}$ is obtained as a sum of collision avoidance boundary value $$u_{dL}\left( = \frac{a_1(\phi_L - \phi_0) + a_2 \Delta y}{b} + u_0 \right)$$

of the expression (29) and a correction term of the trunnion displacement error $y_{tsb}$, that is, $$-\frac{y_{tsb}}{b}.$$

By virtue of compensation for both the ratio change boundary value and the collision avoidance boundary value, as discussed above, even in the presence of a so-called torque shift that the vertical displacement of the trunnion (or the power roller) undesirably occurs due to the input torque, it is possible to more accurately calculate or insure the reliable area of step-motor displacement u capable of certainly shifting or diverging the transmission ratio to the speed-reduction side (low ratio) with no collision-contact between the trunnion and its stopper.

Figure 13:
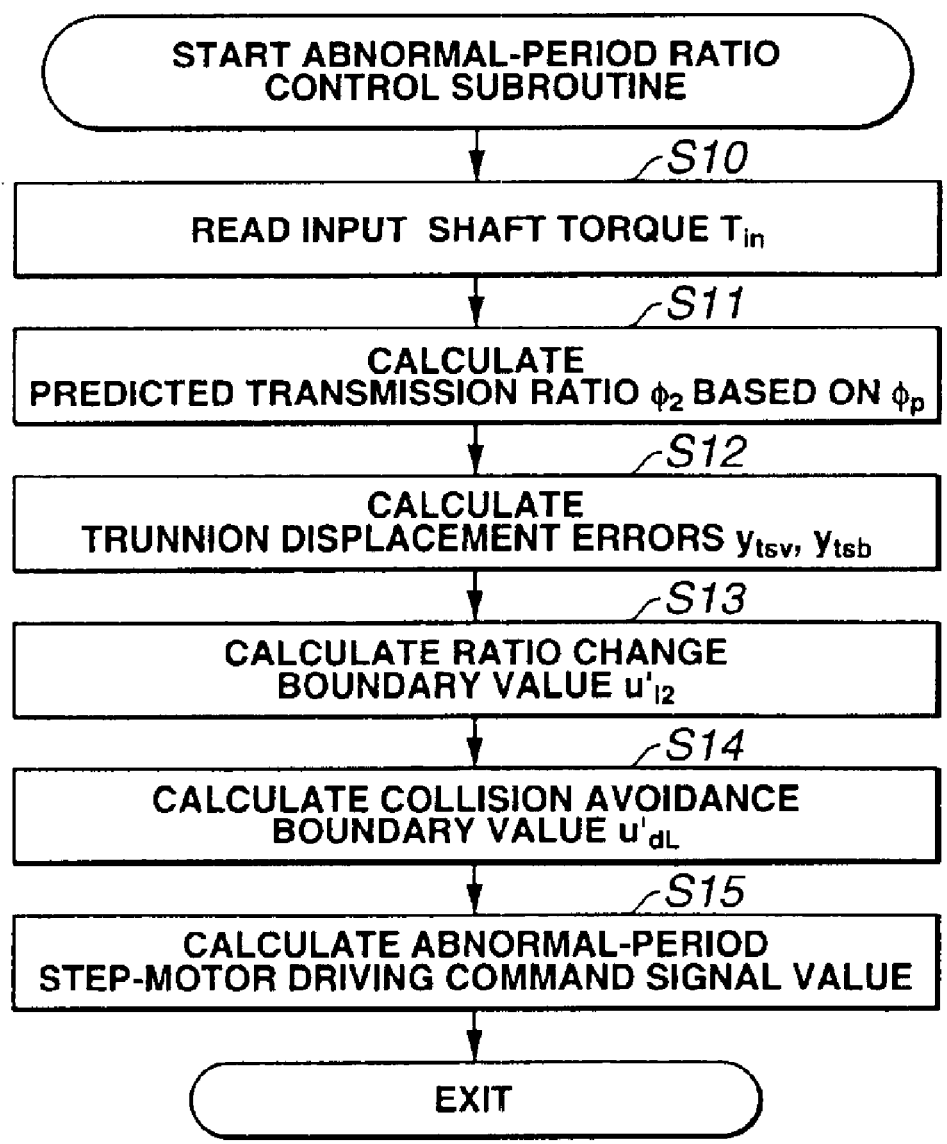
FIG. 13 is a flow chart illustrating an abnormal-period ratio control subroutine executed by the abnormal-period ratio control section shown in FIG. 10.

Referring now to FIG. 13, there is shown the abnormal-period ratio control subroutine executed within electronic TCVT control unit 80 of the TCVT reverse ratio control system of the embodiment, related to step S9 of FIG. 9.

At step S10, input shaft torque $T_{in}$, detected by transmission input shaft torque sensor 87, is read.

At step S11, predicted transmission ratio (in other words, predicted tilt angle) $\phi_2$, based on the assumption that the transmission ratio shifts or diverges to the highest ratio (of the speed-increase side) given or estimated at the present time at maximum ratio-changing speed $\Delta\phi_n$, is calculated based on tilt angle $\phi_p$ detected by tilt angle sensor 85 just before a transition from a state wherein the transmission ratio can be detected to a state wherein the transmission ratio cannot be detected takes place, from the expressions (22) and (23).

At step S12, first trunnion displacement error $y_{tsv}$ is calculated or map-retrieved based on the current transmission ratio G and input shaft torque $T_{in}$ from the predetermined G–$T_{in}$–$y_{tsv}$ characteristic map shown in FIG. 11. At the same time, second trunnion displacement error $y_{tsb}$ is calculated or map-retrieved based on the current transmission ratio G and input shaft torque $T_{in}$ from the predetermined G–$T_{in}$–$y_{tsb}$ characteristic map shown in FIG. 12.

At step S13, taking into account both of the first and second trunnion displacement errors $y_{tsv}$ and $y_{tsb}$, ratio change boundary value $u'_{12}$ is calculated from the expression (31).

Similarly to step S13, at step S14, taking into account the second trunnion displacement error $y_{tsb}$, collision avoidance boundary value $u'_{dL}$ is calculated from the expression (33).

At step S15, for instance, an abnormal-period step-motor driving command signal value of step-motor displacement u is calculated as a simple average of ratio change boundary value $u'_{12}$ calculated from the expression (31) and collision avoidance boundary value $u'_{dL}$ calculated from the expression (33), from the following expression (34).

$$u = (u'_{12} + u'_{dL})/2 \quad (34)$$

Instead of using the simple average, the abnormal-period step-motor driving command signal value of step-motor displacement u may be calculated as a weighted average $(u=(w_1 \cdot u'_{12} + w_2 \cdot u'_{dL})/w_1+w_2)$ of ratio change boundary value $u'_{12}$ and collision avoidance boundary value $u'_{dL}$, on the assumption that ratio change boundary value $u'_{12}$ is to have a weight $w_1$ and collision avoidance boundary value $u'_{dL}$ is to have a weight $w_2$.

As set out above, according to the TCVT ratio control apparatus including abnormal-period ratio control section 104 shown in FIG. 10, the area of step-motor displacement u that the transmission ratio shifts or diverges to the speed-reduction side (low ratio) in the reverse operating mode, can be represented by the hatched area of FIG. 6. This hatched area varies depending on tilt angle $\phi$ (in other words, a transmission ratio). After a transition from a state wherein the transmission ratio can be detected to a state wherein the transmission ratio cannot be detected occurs, the power-roller tilt angle may diverge to either the speed-increase side or the speed-reduction side (see the arrow A directed from $\phi_0$ to $\phi_1$ and the arrow B directed from $\phi_0$ to $\phi_2$ in FIG. 8). Thus, assuming that tilt angle $\phi$ (in other words, a transmission ratio) that has diverged to a tilt angle corresponding to the lowest ratio (of the speed-reduction side) given or predicted at the present time is denoted by $\phi_1$ and additionally tilt angle $\phi$ (in other words, a transmission ratio) that has diverged to a tilt angle corresponding to the highest ratio (of the speed-increase side) given or predicted at the present time is denoted by $\phi_2$, it is difficult to obtain information regarding which tilt angle ranging from $\phi_1$ to $\phi_2$ the current tilt angle is identical to. This means that it is difficult to obtain information regarding which boundary value ranging between two different ratio change boundary values $u_{11}$ and $u_{12}$ shown in FIGS. 6 and 8 the current ratio change boundary value is identical to. For the reasons set forth above, in the system of the shown embodiment, ratio change boundary value $u_{12}$ corresponding to the boundary value of tilt angle $\phi_2$ (predicted as the highest transmission ratio at the present time) that the area of step-motor displacement u diverging to the speed-reduction side (low ratio) becomes narrowest at the present time is determined or calculated as the final ratio change boundary value (see the high-to-low ratio change boundary value $u_{12}$ circled by the broken line in FIG. 8). Therefore, it is possible to more accurately compute or calculate the area of step-motor displacement u capable of certainly shifting or diverging the transmission ratio to the speed-reduction side (low ratio) at the current control cycle (at the present time) at which the electronic TCVT control system is in the abnormal state that transmission ratio G cannot be detected or estimated. Additionally, as can be seen from a series of steps S10–S15 of FIG. 13, it is possible to more theoretically calculate the area of step-motor displacement u diverging to the speed-reduction side (low ratio). Thus, it is possible to reduce the production costs and time required to detect or determine the previously-noted area of step-motor displacement u by way of experiments or simulation tests. In addition to the above, according to the TCVT ratio control apparatus including abnormal-period ratio control section 104 shown in FIG. 10, the area of step-motor displacement u that trunnion 23 is not brought into collision-contact with its stopper during the vertical displacement of the trunnion (the vertical offset in the direction of the trunnion axis) in the reverse operating mode, can be represented by the hatched area of FIG. 7. This hatched area varies depending on tilt angle $\phi$ (in other words, a transmission ratio). In the presence of the transition from the normal state to the abnormal state, it is difficult to obtain information regarding which tilt angle ranging from $\phi_1$ to $\phi_2$ the current tilt angle is identical to. This means that it is difficult to obtain information regarding which boundary value ranging between two different collision avoidance boundary values $u_{d1}$ and $u_{d2}$ shown in FIGS. 7 and 8 the current collision avoidance boundary value is identical to. For the reasons set forth above, in the system of the shown embodiment, collision avoidance boundary value $u_{d1}$ corresponding to the boundary value of tilt angle $\phi_1$ (predicted as the lowest transmission ratio at the present time) that the area of step-motor displacement u preventing the trunnion from being brought into collision-contact with its stopper during the vertical displacement of the trunnion becomes narrowest at the present time is determined or calculated as the final collision avoidance boundary value (see the collision avoidance boundary value $u_{d1}$ circled by the broken line in FIG. 8). Generally, during normal ratio-changing operation, the power-roller tilt angle is adjusted or controlled to an angular position closer to the stopper position of the speed-reduction side. Thus, tilt angle $\phi_1$ corresponding to the lowest ratio (of the speed-reduction side) given or predicted at the present time is determined or estimated as the minimum value $\phi_L$ (corresponding to the stopper position at the speed-reduction side). As a consequence, it is possible to accurately calculate the area of step-motor displacement u capable of certainly preventing or avoiding trunnion 23 from being brought into collision-contact with its stopper. Additionally, as can be seen from a series of steps S10–S15 of FIG. 13, it is possible to more theoretically calculate the area of step-motor displacement u that trunnion 23 is not brought into collision-contact with its stopper during ratio-changing operation.

Figure 14:
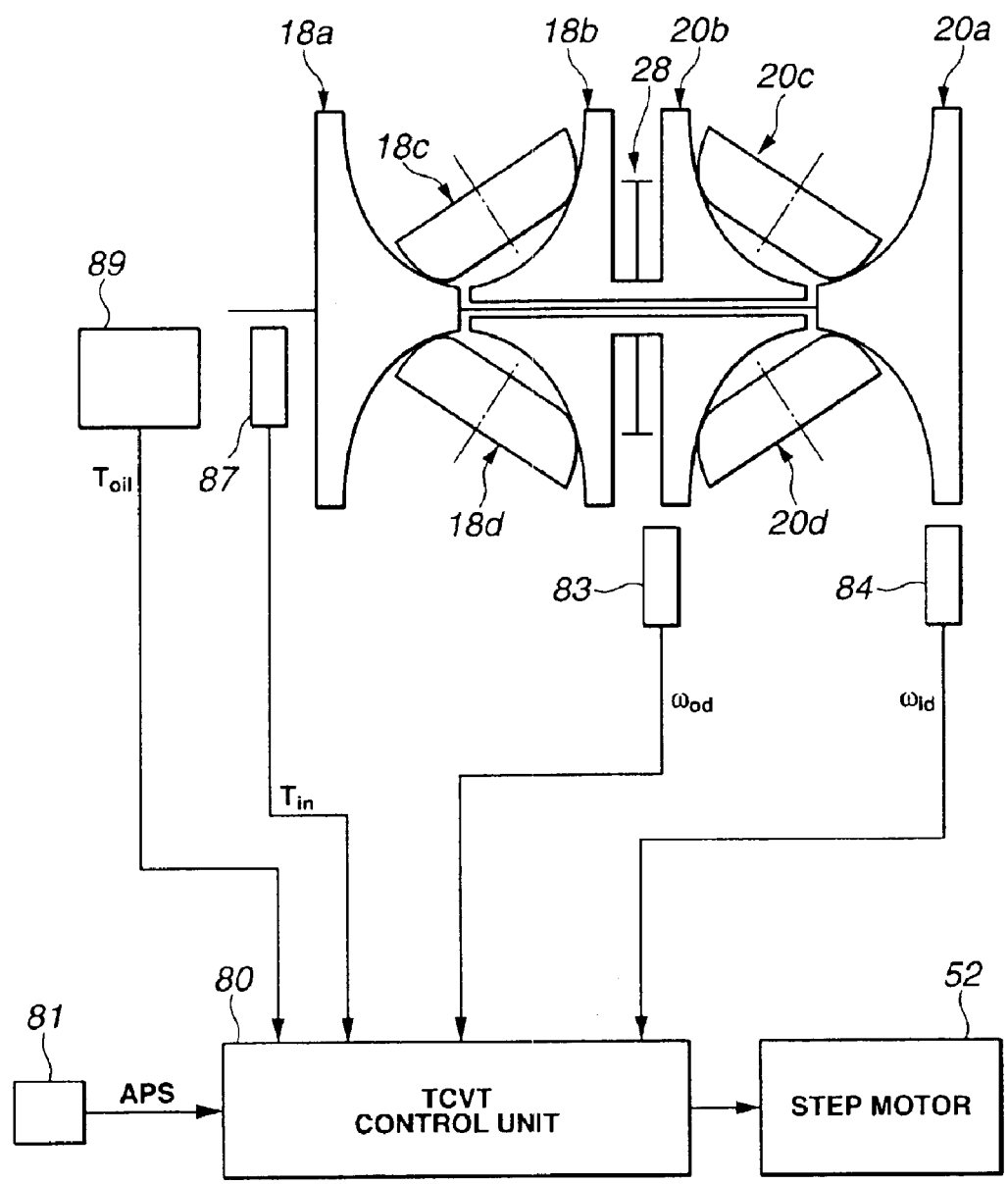
FIG. 14 is a system diagram illustrating another TCVT reverse ratio control system of the embodiment.
Figure 15:
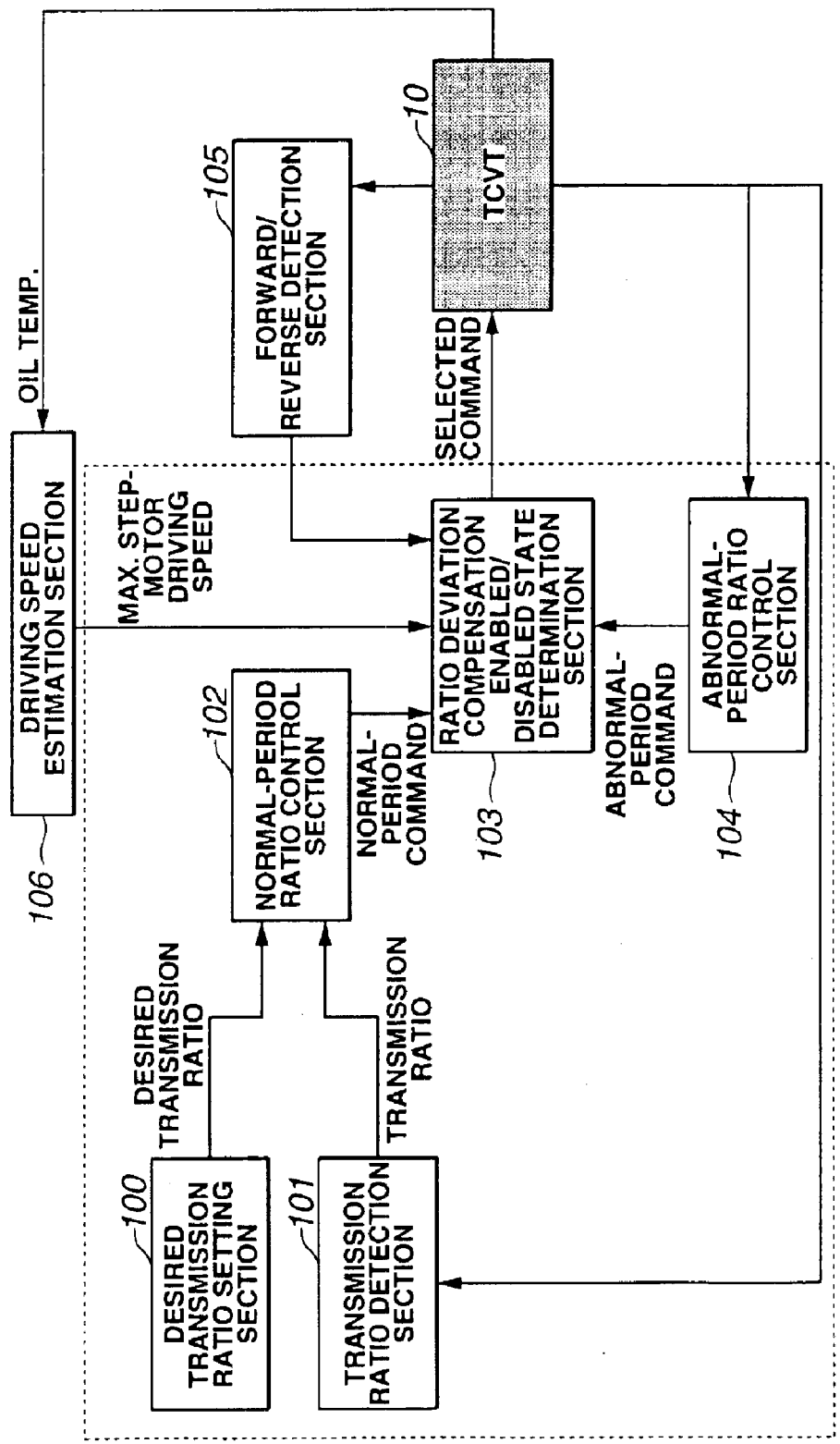
FIG. 15 is a block diagram illustrating the TCVT reverse ratio control system shown in FIG. 14.
Figure 16:
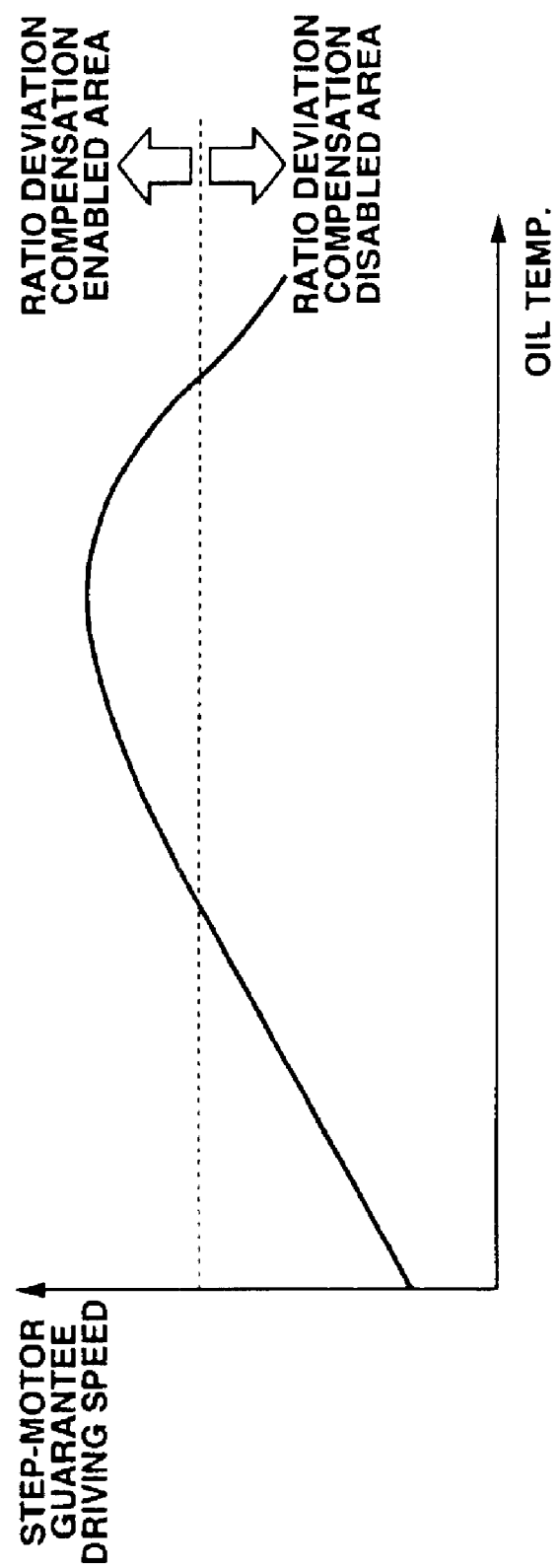
FIG. 16 is an oil-temperature-dependent step-motor guarantee driving speed specification.

Referring now to FIG. 14, there is shown the electronic TCVT control apparatus employing a second reverse ratio control system used in the reverse operating mode. The second reverse ratio control system of FIG. 14 is different from the first reverse ratio control system of FIG. 3, in that an oil temperature sensor 89 is further added and a sensor signal value from oil temperature sensor 89 is sufficiently taken into account. Oil temperature sensor 89 is provided to monitor or detect a TCVT variator temperature, such as a temperature $T_{oil}$ of working fluid (traction oil) of TCVT 10. The second TCVT reverse ratio control system of FIG. 14 includes oil temperature sensor 89 as well as sensors 81, 83, 84, and 87, electronic TCVT control unit 80, and step motor 52. In a similar manner to the first reverse ratio control system of FIG. 3, the second reverse ratio control system of FIG. 14 may further include sensors 82, 85, and 86. Referring now to FIG. 15, there is shown the block diagram for system operation (ratio-changing control) of electronic TCVT control unit 80 included in the second TCVT reverse ratio control system of FIG. 14. As seen from the block diagram of FIG. 15, TCVT control unit 80 included in the second TCVT reverse ratio control system is comprised of a desired transmission ratio setting section (a desired transmission ratio setting means) 100, a transmission ratio detection section (a transmission ratio detection means) 101, a normal-period ratio control section (a normal-period ratio control means) 102, a ratio deviation compensation enabled/disabled state determination section (a ratio deviation compensation enabled/disabled state determination means) 103, an abnormal-period ratio control section (an abnormal-period ratio control means) 104, a forward/reverse detection section (a forward/reverse detection means) 105, and a step-motor driving speed estimation section (a step-motor driving speed estimation means) 106. As can be appreciated from comparison of the first and second TCVT reverse ratio control systems of FIGS. 4 and 15, the second TCVT reverse ratio control system shown in FIGS. 14 and 15 is similar to the first TCVT reverse ratio control system shown in FIGS. 3 and 4, except that forward/reverse detection section 105 and step-motor driving speed estimation section 106 are further added. Thus, in explaining the second TCVT reverse ratio control system of FIGS. 14 and 15, for the purpose of comparison of the first and second TCVT reverse ratio control systems, the same reference signs used to designate elements in the first reverse ratio control system will be applied to the corresponding elements used in the second reverse ratio control system. Ratio deviation compensation enabled/disabled state determination section 103 of the second reverse ratio control system is somewhat different from that of the first reverse ratio control system, whereas sections 100–102 and 104 are the same in the first and second reverse ratio control systems. Sections 103, 105 and 106 will be hereinafter described in detail with reference to the accompanying drawings, while detailed description of the same reference signs 100–102 and 104 will be omitted because the above description thereon seems to be self-explanatory. The system shown in FIGS. 14 and 15, further utilizes an output signal from forward/reverse detection section 105, so as to properly vary adjustable control gains $k_P$, $k_D$, $k_I$ of the PID controller defined by the previously-described expression (11), depending on the vehicle's traveling direction. This is because a step-motor displacement versus power-roller tilt angle characteristic, that is, a step-motor displacement versus transmission ratio characteristic somewhat varies depending on the vehicle's traveling direction (that is, depending on whether the vehicle is traveling forward or backward). Therefore, switching between a first group of PID-controller gains $k_P$, $k_D$, $k_I$ suitable for the vehicle's forward driving and a second group of PID-controller gains $k_P$, $k_D$, $k_I$ suitable for the vehicle's backward driving, is made responsively to the output signal from forward/reverse detection section 105. Forward/reverse detection section 105 is provided to detect or determine whether the vehicle is, traveling forward or backward and to generate the output signal indicative of the vehicle's traveling direction. Concretely, forward/reverse detection section 105 receives a two-phase pulse signal from either one of output-disk speed sensor 83 and input-disk speed sensor 84 attached to TCVT 10 to detect the rotation direction of the output disk or the input disk, and thus to determine the vehicle's traveling direction from the two-phase pulse signal (i.e., the detection result of rotation direction). On the other hand, step-motor driving speed estimation section 106 receives a sensor signal from oil temperature sensor 89 and estimates a step-motor guarantee driving speed of step motor 52 based on oil temperature $T_{oil}$ detected by oil temperature sensor 89 from an oil-temperature dependent step-motor guarantee driving speed specification of FIG. 16 showing how the step-motor guaranteed driving speed varies relative to oil temperature $T_{oil}$. Actually, the oil-temperature dependent step-motor guarantee driving speed specification of FIG. 16 is experimentally assured by the inventors of the present invention. Ratio deviation compensation enabled/disabled state determination section 103 of the second reverse ratio control system determines whether or not the deviation of transmission ratio G from desired transmission ratio G* can be compensated for by means of normal-period ratio control section 102. Ratio deviation compensation enabled/disabled state determination section 103 determines that the deviation of transmission ratio G from desired transmission ratio G* can be compensated for by means of normal-period ratio control section 102, when the electronic TCVT control system is in the normal state that the transmission ratio is detectable or estimatable, for example, in absence of a sensor failure of at least one of output-disk speed sensor 83 and input-disk speed sensor 84 or a sensor system failure such as a breakage in the sensor system signal line. Conversely when the electronic TCVT control system is in the abnormal state that the transmission ratio cannot be detected or estimated, for example, in presence of a sensor failure of at least one of output-disk speed sensor 83 and input-disk speed sensor 84 or a sensor system failure, ratio deviation compensation enabled/disabled state determination section 103 determines that the deviation of transmission ratio G from desired transmission ratio G* cannot be compensated for by means of normal-period ratio control section 102. In addition to the above, ratio deviation compensation enabled/disabled state determination section 103 is also responsive to the output signals from forward/reverse detection section 105 and step-motor driving speed estimation section 106, to determine that the deviation of transmission ratio G from desired transmission ratio G* cannot be compensated for by means of normal-period ratio control section 102, when the output signal from forward/reverse detection section 105 indicates that the vehicle is traveling backward and the step-motor guarantee driving speed estimated by step-motor driving speed estimation section 106 is within a reverse-operating-mode ratio deviation compensation disabled area below the horizontal boundary line indicated by the broken line in FIG. 16. That is, the lower reverse-operating-mode ratio deviation compensation disabled area of FIG. 16, corresponds to a step-motor driving speed range in which the deviation of transmission ratio G from desired transmission ratio G* cannot be compensated for by means of normal-period ratio control section 102 when the vehicle is traveling backward. On the contrary, the upper reverse-operating-mode ratio deviation compensation enabled area of FIG. 16, corresponds to a step-motor driving speed range in which the deviation of transmission ratio G from desired transmission ratio G* can be compensated for by means of normal-period ratio control section 102 when the vehicle is traveling backward. During the normal state in which the deviation of transmission ratio G from desired transmission ratio G* can be compensated for by means of normal-period ratio control section 102, ratio deviation compensation enabled/disabled state determination section 103 outputs the normal-period step-motor driving command signal to step motor 52 of TCVT 10. Conversely during the abnormal state in which the deviation of transmission ratio G from desired transmission ratio G* cannot be compensated for by means of normal-period ratio control section 102, ratio deviation compensation enabled/disabled state determination section 103 outputs the abnormal-period step-motor driving command signal from abnormal-period ratio control section 104 to step motor 52 of TCVT 10.

Figure 17:
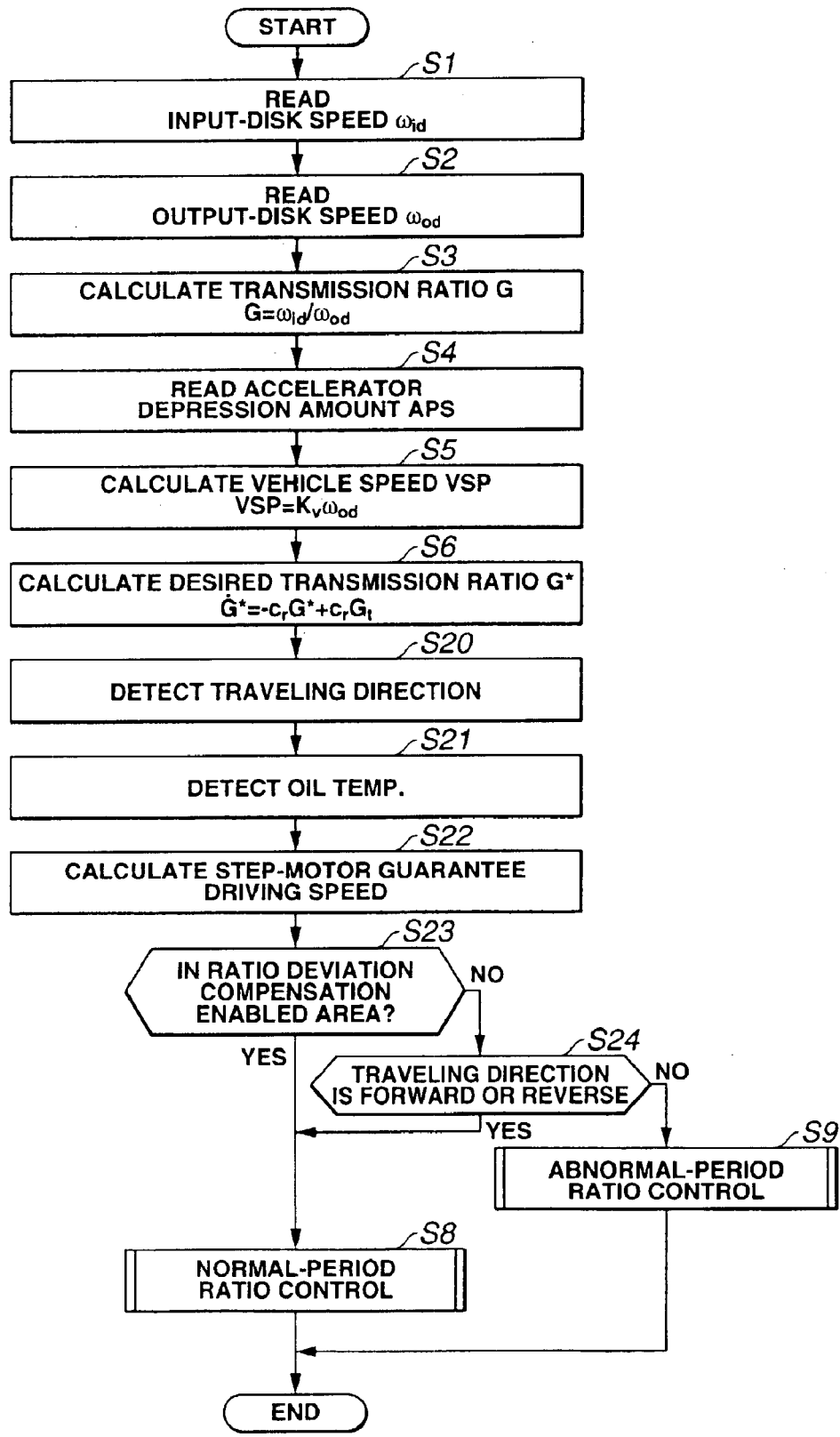
FIG. 17 is a flowchart illustrating a control routine executed by the TCVT reverse ratio control system shown in FIGS. 14 and 15.

Referring now to FIG. 17, there is shown the control routine executed within electronic TCVT control unit 80 of the second TCVT reverse ratio control system of FIGS. 14 and 15. The control routine of FIG. 17 is executed as time-triggered interrupt routines to be triggered every predetermined sampling time intervals such as 20 milliseconds. The control routine of FIG. 17 is similar to the control routine of FIG. 9, except that step S7 included in the routine shown in FIG. 9 is replaced with steps S20–S24 included in the routine shown in FIG. 17. Thus, the same step numbers used to designate steps in the routine shown in FIG. 9 will be applied to the corresponding step numbers used in the modified routine shown in FIG. 17, for the purpose of comparison of the two different interrupt routines. Steps S20–S24 will be hereinafter described in detail with reference to the accompanying drawings, while detailed description of steps S1–S6, S8 and S9 will be omitted because the above description thereon seems to be self-explanatory.

At step S20, the vehicle's traveling direction is detected based on the two-phase pulse signal from either one of output-disk speed sensor 83 and input-disk speed sensor 84.

At step S21, oil temperature $T_{oil}$, detected by oil temperature sensor 89, is read.

At step S22, the step-motor guarantee driving speed is calculated or estimated based on the current value of oil temperature $T_{oil}$ from the oil-temperature dependent step-motor guarantee driving speed specification of FIG. 16.

At step S23, a check is made to determine whether the step-motor guarantee driving speed based on the current oil temperature $T_{oil}$ is within the upper reverse-operating-mode ratio deviation compensation enabled area of FIG. 16, in which the deviation of transmission ratio G from desired transmission ratio G* can be compensated for by means of normal-period ratio control section 102 during the reverse operating mode. When the answer to step S23 is in the affirmative (YES), that is, the step-motor guarantee driving speed based on the current oil temperature $T_{oil}$ is within the reverse-operating-mode ratio deviation compensation enabled area, the routine proceeds from step S23 to step S8. Conversely when the answer to step S23 is in the negative (NO), that is, the step-motor guarantee driving speed based on the current oil temperature $T_{oil}$ is within the reverse-operating-mode ratio deviation compensation disabled area, the routine proceeds from step S23 to step S24.

At step S24, a check for the vehicle's traveling direction is made, utilizing the detection result of step S20. When the vehicle is traveling forward, the routine flows from step S24 to step S8. In contrast, when the vehicle is traveling backward, the routine flows from step S24 to step S9.

Thereafter, at step S8, the normal-period step-motor driving command signal value corresponding to step-motor displacement u suited to the normal state, is arithmetically calculated based on desired transmission ratio G* and transmission ratio G by way of the PID controller defined by the expression (11), that is, $$u = \left(k_P + k_D s + \frac{k_I}{s}\right)(G^* - G).$$

Then, the normal-period step-motor driving command signal value (for step-motor displacement u) calculated by way of the PID controller is output to step motor 52 of TCVT 10 to perform closed-loop feedback control.

At step S9, the anticipating correction signal value that the transmission ratio is shifted or diverged to the speed-reduction side (low ratio) and additionally the trunnion is prevented or avoided from being brought into collision-contact with its stopper during the vertical displacement of trunnion 23, is set as the abnormal-period step-motor driving command signal value suited to the abnormal state. Then, the abnormal-period step-motor driving command signal value (the anticipating correction signal value) is output to step motor 52 of TCVT 10 so that step-motor displacement u is controlled by way of open-loop feedforward control and adjusted within the range of step-motor displacement u defined by the inequality (21), i.e., $$\frac{a_1(\phi - \phi_0)}{b} + u_0 < u < \frac{a_1(\phi - \phi_0) + a_2 \Delta y}{b} + u_0.$$

In the control routine shown in FIG. 17, steps S1–S3 are related to transmission ratio detection section 101 of FIG. 15, steps S4–S6 are related to desired transmission ratio setting section 100, step S20–24 are related to ratio deviation compensation enabled/disabled state determination section 103, step S8 is related to normal-period ratio control section 102, and step S9 is related to abnormal-period ratio control section 104.

As discussed above, according to the second TCVT reverse ratio control system (see FIGS. 14, 15 and 17) of the TCVT control apparatus of the embodiment, during the reverse operating mode, the maximum driving speed of step motor 52 is estimated based on oil temperature $T_{oil}$ detected. If the maximum step-motor driving speed based on the current oil temperature is within the reverse-operating-mode ratio deviation compensation disabled area, in other words, if the maximum step-motor driving speed based on the current oil temperature is out of the reverse-operating-mode ratio deviation compensation enabled area, the abnormal-period step-motor driving command signal value suited to the abnormal state is selected by means of ratio deviation compensation enabled/disabled state determination section 103, to realize step-motor displacement u capable of certainly shifting or diverging the transmission ratio to the speed-reduction side (low ratio) with no collision-contact between the trunnion and its stopper during the reverse operating mode. As a consequence, even when the actual step-motor driving speed is within the reverse-operating-mode ratio deviation compensation disabled area in which the deviation of transmission ratio G from desired transmission ratio G* cannot be compensated for by means of normal-period ratio control section 102, it is possible to prevent or avoid a driving torque decrease or a so-called "high-ratio starting". Additionally, by certainly reliably avoiding undesired collision-contact between the trunnion and its stopper, it is possible to effectively suppress or prevent undesired wear and heat generation in the very limited contact zone and to enhance the durability of the TCVT.

Figure 18:
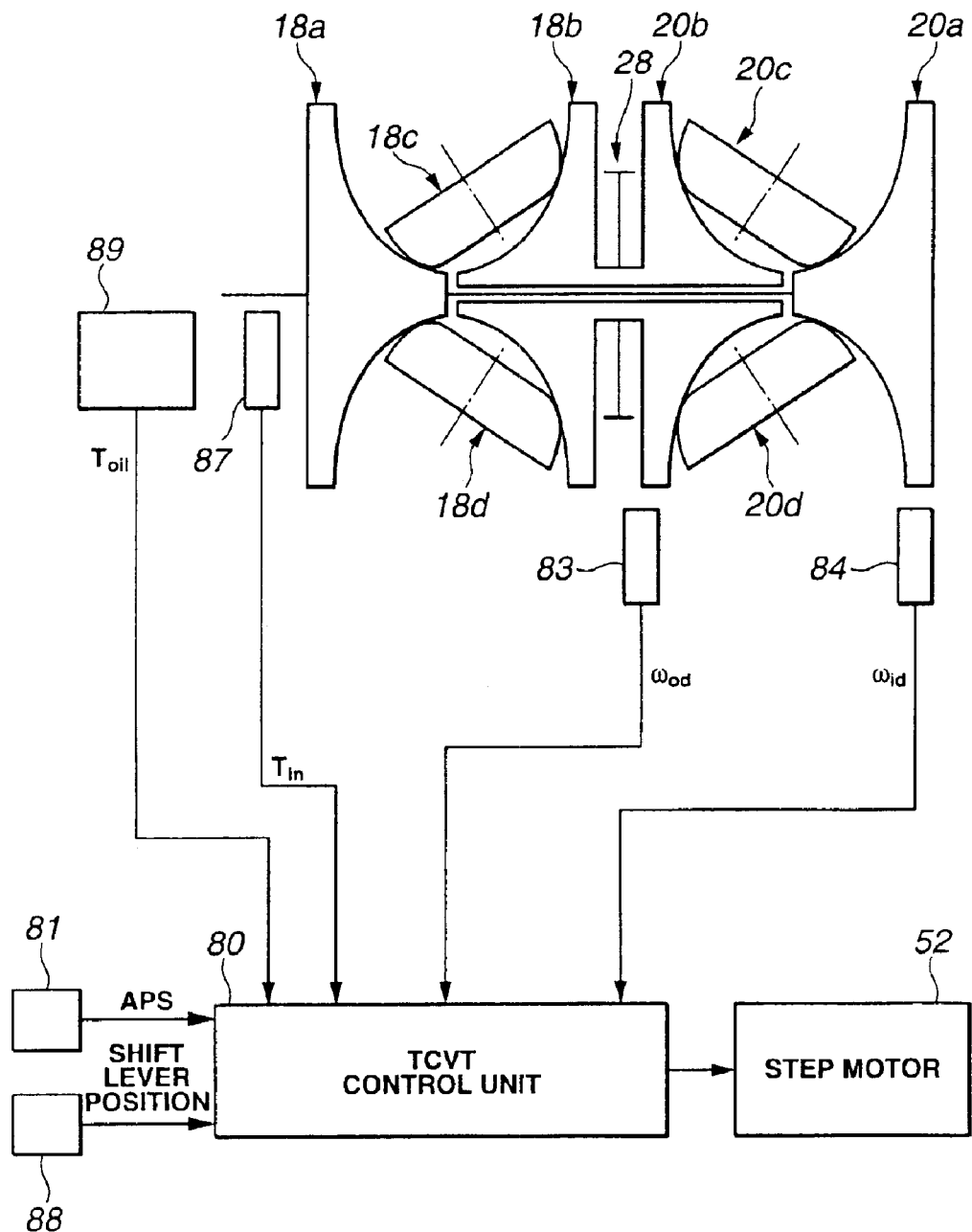
FIG. 18 is a system diagram illustrating another TCVT reverse ratio control system of the embodiment.

Referring now to FIG. 18, there is shown the electronic TCVT control apparatus employing a third reverse ratio control system used in the reverse operating mode. The third reverse ratio control system of FIG. 18 is different from the second reverse ratio control system of FIG. 14, in that forward/reverse detection section 105 utilizes a switch signal from a shift lever (e.g., D, N, R and P) position switch or an inhibitor switch 88 so as to estimate or determine, based on the inhibitor switch signal, whether the vehicle is traveling forward or backward. For instance, when the signal from inhibitor switch 88 is indicative of a D range, forward/reverse detection section 105 temporarily estimates or determines that the vehicle is traveling forward. On the contrary when the signal from inhibitor switch 88 is indicative of an R range, forward/reverse detection section 105 temporarily estimates or determines that the vehicle is traveling backward. Forward/reverse detection section 105 switches from a temporary determination (or a temporary estimation) that the vehicle is traveling forward to a final determination (or a final estimation) that the vehicle is traveling backward, when transmission ratio G is shifted to the speed-increase side (higher ratio) with respect to desired transmission ratio G* used as a reference, to such an extent that the deviation of transmission ratio G from desired transmission ratio G* is greater than a ratio deviation corresponding to a value $(y_n + y_{ts})$ * In a similar manner, forward/reverse detection section 105 switches from a temporary determination (or a temporary estimation) that the vehicle is traveling backward to a final determination (or a final estimation) that the vehicle is traveling forward, when transmission ratio G is shifted to the speed-increase side (higher ratio) with respect to desired transmission ratio G* used as a reference, to such an extent that the deviation of transmission ratio G from desired transmission ratio G* is greater than a ratio deviation corresponding to the value $(y_n + y_{ts})$. The value denoted by $y_n$ is a maximum value of the speed-increase side detection error (i.e., the sensor noise error) of the transmission ratio. The value denoted by $y_{ts}$ is a maximum value of the transmission-ratio deviation from the desired transmission ratio, occurring due to the torque shift. That is, the value $(y_n + y_{ts})$ is the sum of the maximum value $y_n$ of the sensor noise error and the maximum value $y_{ts}$ of the torque-shift dependent transmission-ratio deviation. In other words, the sum $(y_n + y_{ts})$ of the maximum sensor noise error $y_n$ and the maximum torque-shift dependent transmission-ratio deviation $y_{ts}$ is set as the maximum value of the normal-period transmission-ratio deviation. For the reasons discussed below, the switching operation from the temporary determination (or the temporary estimation) to the final determination (or the final estimation) is required.

When determining or estimating the vehicle's traveling direction based on the inhibitor switch signal indicative of the shift lever position, there is a possibility that the shift lever position is not always identical to the actual vehicle's traveling direction owing to particular vehicle driving conditions, for example, during steep uphill driving or during steep downhill driving. Under these particular conditions, in the event that ratio deviation compensation enabled/disabled state determination section 103 of the second reverse ratio control system determines, based on low oil temperatures (i.e., comparatively low maximum step-motor driving speeds), that the transmission-ratio deviation $\Delta G(=|G-G^*|)$ cannot be compensated for by means of normal-period ratio control section 102, and additionally the vehicle actually travels forwards but forward/reverse detection section 105 erroneously estimates or determines that the vehicle is traveling backward, transmission ratio G tends to undesirably diverge to the speed-increase side (higher ratio) with respect to desired transmission ratio G*. On the contrary, in the event that ratio deviation compensation enabled/disabled state determination section 103 of the second reverse ratio control system determines, based on low oil temperatures (i.e., comparatively low maximum step-motor driving speeds), that the transmission-ratio deviation $\Delta G(=|G-G^*|)$ cannot be compensated for by means of normal-period ratio control section 102, and additionally the vehicle actually travels backwards but forward/reverse detection section 105 erroneously estimates or determines that the vehicle is traveling forward, transmission ratio G tends to diverge to (i) the speed-increase side (higher ratio) or (ii) the speed-reduction side (lower ratio) with respect to desired transmission ratio G*. In presence of the divergence to the speed-reduction side (lower ratio) with respect to desired transmission ratio G*, there is no problem because of a desirable ratio-changing direction. Conversely in presence of the excessive divergence to the speed-increase side (higher ratio) with respect to desired transmission ratio G*, there is a problem of poor acceleration feel. For the reasons set forth above, it is necessary to switch from the temporary determination (or the temporary estimation for the vehicle's traveling direction) to the final determination (or the final estimation), observing or detecting the ratio deviation $\Delta G(=|G-G^*|)$ from desired transmission ratio G* to the speed-increase side (higher ratio). As explained above, according to the third TCVT reverse ratio control system (see FIG. 18) of the TCVT control apparatus of the embodiment, during the reverse operating mode, it is possible to effectively minimize or reduce the ratio deviation $\Delta G(=|G-G^*|)$ from desired transmission ratio G* to the speed-increase side (higher ratio) by switching from the temporary determination (or the temporary estimation for the vehicle's traveling direction) to the final determination (or the final estimation). This avoids a driving torque decrease or a so-called "high-ratio starting" and insures better acceleration feel during the vehicle's starting period. Additionally, it is possible to more certainly decide or judge whether the ratio-changing control matches the actual vehicle's traveling direction by using the maximum value of the normal-period transmission-ratio deviation, i.e., the sum $(y_n+y_{ts})$ of the maximum sensor noise error $y_n$ and the maximum torque-shift dependent transmission-ratio deviation $y_{ts}$, thus ensuring the low-ratio starting with no poor acceleration feel.

Hereinafter described in brief in reference to FIG. 17 is the control routine executed within electronic TCVT control unit 80 of the third TCVT reverse ratio control system of FIG. 18. The control routine executed by the third TCVT reverse ratio control system of FIG. 18 is somewhat different from the control routine executed by the second TCVT reverse ratio control system of FIGS. 14 and 15, from the following viewpoint. In the second TCVT reverse ratio control system of FIGS. 14 and 15, the vehicle's traveling direction is detected based on the two-phase pulse signal from either one of output-disk speed sensor 83 and input-disk speed sensor 84. On the other hand, in the third TCVT reverse ratio control system of FIG. 18, through step S20 of FIG. 17, forward/reverse detection section 105 temporarily estimates or determines the vehicle's traveling direction responsively to the signal from inhibitor switch 88 in such a manner as to temporarily determine that the vehicle is traveling forward when the inhibitor switch signal indicates the D range and to temporarily determine that the vehicle is traveling backward when the inhibitor switch signal indicates the R range. Thereafter, when the transmission-ratio deviation $\Delta G(=|G-G^*|)$ from desired transmission ratio G* to the speed-increase side exceeds the maximum value $(y_n+y_{ts})$ of the normal-period transmission-ratio deviation, forward/reverse detection section 105 executes switching from a temporary determination (or a temporary estimation) that the vehicle is in one of forward and reverse operating modes to a final determination (or a final estimation) that the vehicle is in the other operating mode. As discussed above, even when the actual step-motor driving speed is within the reverse-operating-mode ratio deviation compensation disabled area in which the transmission-ratio deviation $\Delta G(=|G-G^*|)$ from desired transmission ratio G* cannot be compensated for by means of normal-period ratio control section 102, it is possible to prevent or avoid a driving torque decrease or a so-called "high-ratio starting" by properly compensating for the erroneous determination for the vehicle's traveling direction. Additionally, by certainly reliably avoiding undesired collision-contact between the trunnion and its stopper, it is possible to effectively suppress or prevent undesired wear and heat generation in the very limited contact zone and to enhance the durability of the TCVT.

Although forward/reverse detection section 105 included in third reverse ratio control system of FIG. 18 utilizes an inhibitor switch signal to estimate or determine the vehicle's traveling direction, a determination or estimation for the vehicle's traveling direction may be modified as follows.

First of all, forward/reverse detection section 105 unconditionally determines or estimates that the vehicle is in the reverse operating mode. Then, if the transmission-ratio deviation $\Delta G(=|G-G^*|)$ from desired transmission ratio G* to the speed-increase side exceeds the maximum normal-period ratio deviation $(y_n+y_{ts})$, logically, forward/reverse detection section 105 initiates switching from a first determination (or a first estimation) that the vehicle is in the reverse operating mode to a second determination (or a second estimation) that the vehicle is in the forward operating mode when the reverse operating mode is estimated, or initiates switching from a first determination (or a first estimation) that the vehicle is in the forward operating mode to a second determination (or a second estimation) that the vehicle is in the reverse operating mode when the forward operating mode is estimated. For the reasons discussed below, the switching operation from the first determination (or the first estimation) to the second determination (or the second estimation) is required.

In order to diverse the transmission ratio to the speed-reduction side (low ratio), it is necessary to drive step motor 52 to the position corresponding to step-motor displacement u defined by the inequality (21). For the purpose of more certainly diverging the transmission ratio to the speed-reduction side (low ratio) and driving step motor 52 to the position corresponding to step-motor displacement u defined by the inequality (21), first of all, forward/reverse detection section 105 unconditionally determines or estimates that the vehicle is in the reverse operating mode. As previously described with reference to the third reverse ratio control system of FIG. 18, transmission ratio G tends to diverge to the speed-increase side (higher ratio) relative to desired transmission ratio G*, when the vehicle actually travels forwards but forward/reverse detection section 105 erroneously estimates or determines that the vehicle is in the reverse operating mode. Thus, in presence of the excessive divergence of transmission ratio G from desired transmission ratio G* to the speed-increase side (higher ratio), forward/reverse detection section 105 switches from the first estimation for the vehicle's traveling direction to the second estimation that the vehicle is in the forward operating mode. Conversely when the vehicle actually travels backwards but forward/reverse detection section 105 erroneously estimates or determines that the vehicle is in the forward operating mode, transmission ratio G tends to diverge to (i) the speed-increase side (higher ratio) relative to desired transmission ratio G* or (ii) the speed-reduction side (lower ratio) relative to desired transmission ratio G*. The divergence of transmission ratio G from desired transmission ratio G* to the speed-reduction side (lower ratio) is allowable. In such a case, there is no problem because of a desirable ratio-changing direction. Conversely, in presence of the divergence to the speed increase side (higher ratio) with respect to desired transmission ratio G*, forward/reverse detection section 105 switches from the first estimation for the vehicle's traveling direction to the second estimation that the vehicle is in the reverse operating mode, observing or detecting the excessive divergence of transmission ratio G from desired transmission ratio G* to the speed-increase side (higher ratio).

As discussed above, according to the system somewhat modified from the third TCVT reverse ratio control system (see FIG. 18), when the vehicle travels backwards, the ratio-changing actuator (step motor 52) can be driven so that the transmission ratio shifts or diverges to the speed-reduction side (low ratio) in advance. Thus, it is possible to prevent the transmission ratio from diverging to the speed-increase side (high ratio) during the reverse operating mode. Additionally, as can be seen from the flow from step S24 to step S8 in the flow chart of FIG. 17, even when the actual step-motor driving speed is within the reverse-operating-mode ratio deviation compensation disabled area, it is possible to recover or return from the abnormal-period ratio control of step S9 to the normal-period ratio control of step S8 if the forward operating mode is finally determined or estimated. This is because TCVT 10 has a characteristic that the transmission ratio tends to diverge or shift to the speed-increase side (high ratio) if the vehicle travels forwards when driving the ratio-changing actuator (step motor 52) in response to the abnormal-period step-motor driving command signal from abnormal-period ratio control section 104.

Hereinafter described in brief in reference to FIG. 17 is the control routine executed within electronic TCVT control unit 80 of the system somewhat modified from the third TCVT reverse ratio control system of FIG. 18. The control routine executed by the system somewhat modified from the third TCVT reverse ratio control system of FIG. 18 is somewhat different from the control routine executed by the third TCVT reverse ratio control system of FIG. 18, from the following viewpoint. In the third TCVT reverse ratio control system of FIG. 18, through step S20 of FIG. 17, forward/reverse detection section 105 temporarily estimates the vehicle's traveling direction responsively to the signal from inhibitor switch 88 in such a manner as to temporarily determine that the vehicle is in the forward operating mode when the inhibitor switch signal indicates the D range and to temporarily determine that the vehicle is in the reverse operating mode when the inhibitor switch signal indicates the R range. Thereafter, when the transmission-ratio deviation $\Delta G(=|G-G^*|)$ from desired transmission ratio G* to the speed-increase side exceeds the maximum value $(y_n+y_{ts})$ of the normal-period transmission-ratio deviation, forward/reverse detection section 105 executes switching from a temporary determination that the vehicle is in one of forward and reverse operating modes to a final determination that the vehicle is in the other operating mode. On the other hand, in the system somewhat modified from the third TCVT reverse ratio control system, through step S20 of FIG. 17, first of all, forward/reverse detection section 105 unconditionally determines or estimates that the vehicle is in the reverse operating mode. Then, if the transmission-ratio deviation $\Delta G(=|G-G^*|)$ from desired transmission ratio G* to the speed-increase side exceeds the maximum normal-period ratio deviation $(y_n+y_{ts})$, logically, forward/reverse detection section 105 initiates switching from a first determination that the vehicle is in the reverse operating mode to a second determination that the vehicle is in the forward operating mode when the reverse operating mode is estimated, and initiates switching from a first determination that the vehicle is in the forward operating mode to a second determination that the vehicle is in the reverse operating mode when the forward operating mode is estimated. As discussed above, in the system somewhat modified from the third TCVT reverse ratio control system of FIG. 18, even when the actual step-motor driving speed is within the reverse-operating-mode ratio deviation compensation disabled area in which the transmission-ratio deviation $\Delta G(=|G-G^*|)$ from desired transmission ratio G* cannot be compensated for by means of normal-period ratio control section 102, it is possible to prevent or avoid a driving torque decrease or a so-called "high-ratio starting" by properly compensating for the erroneous determination for the vehicle's traveling direction. Additionally, by certainly reliably avoiding undesired collision-contact between the trunnion and its stopper, it is possible to effectively suppress or prevent undesired wear and heat generation in the very limited contact zone and to enhance the durability of the TCVT.

The entire contents of Japanese Patent Application Nos. 2002-164849 (filed Jun. 5, 2002) and 2002-245210 (filed Aug. 26, 2002) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A toroidal continuously variable transmission control apparatus for an automotive vehicle comprising:
    a variator unit comprising:
        (i) input and output disks coaxially arranged and opposing each other and having a common rotation axis;
        (ii) a power roller interposed between the input and output disks to transmit torque from the input disk to the output disk via a traction oil film formed between the power roller and each of the input and output disks, using a shearing force in the traction oil film; and (iii) a trunnion that supports a backface of the power roller so that the power roller is rotatable about a power-roller rotation axis; the trunnion being movable in a direction of a trunnion axis perpendicular to the common rotation axis of the input and output disks and the power-roller rotation axis to cause a tilting motion of the power roller and to continuously vary a transmission ratio;

a ratio control hydraulic system comprising:
- (i) a hydraulic actuator producing a displacement of the trunnion in the trunnion-axis direction from an initial position at which the power-roller rotation axis intersects the common rotation axis of the input and output disks;
- (ii) a control valve hydraulically controlling operation of the hydraulic actuator;
- (iii) a ratio control actuator mechanically linked to the control valve to adjust a valve position of the control valve by changing a displacement of the ratio control actuator; and
- (iv) a mechanical feedback device compensating for a difference of a tilt angle of the power roller between forward and reverse operating modes and serving as a positive feedback device in the reverse operating mode and also serving as a negative feedback device in the forward operating mode during which a ratio-control-actuator displacement versus transmission ratio characteristic is relatively stable in comparison with the reverse operating mode; and a control unit comprising:
- (a) a desired transmission ratio setting section (100) setting a desired transmission ratio;
- (b) a transmission ratio detection section detecting a transmission ratio;
- (c) a normal-period ratio control section electronically feedback-controlling the transmission ratio based on a deviation of the transmission ratio from the desired transmission ratio so that the transmission ratio is brought closer to the desired transmission ratio, and generating a normal-period command signal to be input to the ratio control actuator for compensating for the deviation;
- (d) a ratio deviation compensation enabled/disabled state determination section determining whether or not the deviation can be compensated for by the normal-period ratio control section; and
- (e) an abnormal-period ratio control section generating an abnormal-period command signal to be input to the ratio control actuator to realize a ratio-control-actuator displacement capable of shifting the transmission ratio to a speed-reduction side, while keeping the trunnion out of contact with a stopper in the direction of the trunnion axis, when the ratio deviation compensation enabled/disabled state determination section determines that the deviation cannot be compensated for by the normal-period ratio control section.

2. The toroidal continuously variable transmission control apparatus as claimed in claim 1, wherein:

the abnormal-period ratio control section comprises an output-disk speed detection section detecting an output-disk speed input to the output disk, and a predicted transmission ratio calculation section estimating a predicted transmission ratio based on the output-disk speed and a transmission ratio detected before a transition to a state wherein the transmission ratio cannot be detected occurs, assuming that the transmission ratio shifts to a speed-increase side at a maximum ratio-changing speed during a time period from a time when the transition occurs to a current control cycle; and wherein the abnormal-period ratio control section generates the abnormal-period command signal that ratio changing is directed to the speed-reduction side assuming that the predicted transmission ratio is equivalent to the transmission ratio, when the ratio deviation compensation enabled/disabled state determination section determines that the deviation cannot be compensated for by the normal-period ratio control section and additionally the transmission ratio cannot be detected by the transmission ratio detection section.

3. The toroidal continuously variable transmission control apparatus as claimed in claim 1, wherein:

the abnormal-period ratio control section comprises a collision avoidance boundary value calculation section calculating a collision avoidance boundary value of the ratio-control-actuator displacement that the displacement of the trunnion corresponds to a position of the stopper in the direction of the trunnion axis when the tilt angle corresponds to a tilting-motion stopper position of the speed-reduction side; and wherein the abnormal-period ratio control section generates the abnormal-period command signal that ratio changing is directed from the collision avoidance boundary value of the ratio-control-actuator displacement to the speed-reduction side in the forward operating mode, when the ratio deviation compensation enabled/disabled state determination section determines that the deviation cannot be compensated for by the normal-period ratio control section and additionally the transmission ratio cannot be detected by the transmission ratio detection section.

4. The toroidal continuously variable transmission control apparatus as claimed in claim 1, wherein:

the abnormal-period ratio control section comprises an input shaft torque detection section detecting an input shaft torque acting on the input disk, a trunnion displacement error calculation section calculating a trunnion displacement error based on the transmission ratio detected by the transmission ratio detection section and the input shaft torque detected by the input shaft torque detection section; the trunnion displacement error resulting in a ratio change and occurring due to a looseness between the trunnion and the power roller and a torque shift caused by the input shaft torque acting on the input disk during operation of the toroidal continuously variable transmission, and a compensation section compensating for the abnormal-period command signal based on the trunnion displacement error.

5. The toroidal continuously variable transmission control apparatus as claimed in claim 1, further comprising:

a forward/reverse detection section determining a vehicle's traveling direction; and a driving speed estimation section estimating a maximum driving speed of the ratio control actuator; and wherein the ratio deviation compensation enabled/disabled state determination section determines that the deviation cannot be compensated for by the normal-period ratio control section under a particular condition where the forward/reverse detection section determines that the vehicle is traveling backward and additionally the maximum driving speed estimated by the driving speed estimation section is less than a predetermined driving-speed threshold value, and the abnormal-period ratio control section generates the abnormal-period command signal to realize the ratio-control-actuator displacement capable of shifting the transmission ratio to the speed-reduction side, while keeping the trunnion out of contact with the stopper in the direction of the trunnion axis in the reverse operating mode, under the particular condition.

6. The toroidal continuously variable transmission control apparatus as claimed in claim 5, wherein:

the forward/reverse detection section determines the vehicle's traveling direction based on a shift lever position; and the forward/reverse detection section switches from a temporary determination that the vehicle is in one of the forward and reverse operating modes to a final determination that the vehicle is in the other operating mode when the deviation from the desired transmission ratio to a speed-increase side exceeds a predetermined deviation threshold value.

7. The toroidal continuously variable transmission control apparatus as claimed in claim 6, wherein:

the predetermined deviation threshold value is set to a maximum value of a normal-period transmission-ratio deviation.

8. The toroidal continuously variable transmission control apparatus as claimed in claim 7, wherein:

the maximum value of the normal-period transmission-ratio deviation is set to a sum of a maximum value of a speed-increase side detection error of the transmission ratio and a maximum value of a torque-shift dependent transmission-ratio deviation.

9. The toroidal continuously variable transmission control apparatus as claimed in claim 5, wherein:

the forward/reverse detection section unconditionally estimates that the vehicle is in the reverse operating mode; and in case that the deviation from the desired transmission ratio to a speed-increase side exceeds a predetermined deviation threshold value, logically the forward/reverse detection section switches from a determination that the vehicle is in the reverse operating mode to a determination that the vehicle is in the forward operating mode when the reverse operating mode is estimated, and switches from a determination that the vehicle is in the forward operating mode to a determination that the vehicle is in the reverse operating mode when the forward operating mode is estimated.

10. The toroidal continuously variable transmission control apparatus as claimed in claim 5, further comprising:

an oil temperature sensor that detects an oil temperature of the variator unit of the toroidal continuously variable transmission; and wherein the driving speed estimation section estimating the maximum driving speed of the ratio control actuator based on the oil temperature.

11. A toroidal continuously variable transmission control apparatus for an automotive vehicle comprising:

a variator unit comprising:

(i) input and output disks coaxially arranged and opposing each other and having a common rotation axis;

(ii) a power roller interposed between the input and output disks to transmit torque from the input disk to the output disk via a traction oil film formed between the power roller and each of the input and output disks, using a shearing force in the traction oil film; and (iii) a trunnion that supports a backface of the power roller so that the power roller is rotatable about a power-roller rotation axis; the trunnion being movable in a direction of a trunnion axis perpendicular to the common rotation axis of the input and output disks and the power-roller rotation axis to cause a tilting motion of the power roller and to continuously vary a transmission ratio;

a ratio control hydraulic system comprising:

(i) a hydraulic actuator producing a displacement of the trunnion in the trunnion-axis direction from an initial position at which the power-roller rotation axis intersects the common rotation axis of the input and output disks;

(ii) a control valve hydraulically controlling operation of the hydraulic actuator;

(iii) a ratio control actuator mechanically linked to the control valve to adjust a valve position of the control valve by changing a displacement of the ratio control actuator; and (iv) a mechanical feedback device compensating for a difference of a tilt angle of the power roller between forward and reverse operating modes and serving as a positive feedback device in the reverse operating mode and also serving as a negative feedback device in the forward operating mode during which a ratio-control-actuator displacement versus transmission ratio characteristic is relatively stable in comparison with the reverse operating mode; and a control unit comprising:

(a) means for setting a desired transmission ratio based on a vehicle speed and an accelerator depression amount;

(b) means for detecting a transmission ratio based on an input-disk speed and an output-disk speed;

(c) means for electronically feedback-controlling the transmission ratio based on a deviation of the transmission ratio from the desired transmission ratio so that the transmission ratio is brought closer to the desired transmission ratio, and generating a normal-period command signal to be input to the ratio control actuator for compensating for the deviation;

(d) means for generating an abnormal-period command signal to be input to the ratio control actuator to realize a ratio-control-actuator displacement capable of shifting the transmission ratio to a speed-reduction side, while keeping the trunnion out of contact with a stopper in the direction of the trunnion axis; and means for determining whether or not the deviation can be compensated for by the normal-period ratio control section, and for inputting the normal-period command signal to the ratio control actuator when the deviation can be compensated for by the normal-period ratio control section, and for inputting the abnormal-period command signal to the ratio control actuator when the deviation cannot be compensated for by the normal-period ratio control section.

12. A method of controlling a toroidal continuously variable transmission for an automotive vehicle employing a variator unit including input and output disks coaxially arranged and opposing each other and having a common rotation axis, a power roller interposed between the input and output disks to transmit torque from the input disk to the output disk via a traction oil film formed between the power roller and each of the input and output disks, using a shearing force in the traction oil film, and a trunnion that supports a backface of the power roller so that the power roller is rotatable about a power-roller rotation axis; the trunnion being movable in a direction of a trunnion axis perpendicular to the common rotation axis of the input and output disks and the power-roller rotation axis to cause a tilting motion of the power roller and to continuously vary a transmission ratio, and a ratio control hydraulic system including a pressure-differential operated hydraulic servo mechanism producing a displacement of the trunnion in the trunnion-axis direction from an initial position at which the power-roller rotation axis intersects the common rotation axis of the input and output disks, a control valve creating a pressure differential for operating the hydraulic servo mechanism, a step motor mechanically linked to the control valve to adjust a valve position of the control valve by changing a displacement of the step motor, and a mechanical feedback device compensating for a difference of a tilt angle of the power roller between forward and reverse operating modes and serving as a positive feedback device in the reverse operating mode and also serving as a negative feedback device in the forward operating mode during which a ratio-control-actuator displacement versus transmission ratio characteristic is relatively stable in comparison with the reverse operating mode, the method comprising:

setting a desired transmission ratio based on a vehicle speed and an accelerator depression amount;

detecting a transmission ratio based on an input-disk speed and an output-disk speed;

electronically feedback-controlling the transmission ratio based on a deviation of the transmission ratio from the desired transmission ratio so that the transmission ratio is brought closer to the desired transmission ratio, and generating a normal-period command signal to be input to the step motor for compensating for the deviation;

determining whether or not the deviation can be compensated for by electronically feedback-controlling the transmission ratio based on the deviation; and generating an abnormal-period command signal to be input to the step motor to realize a step-motor displacement capable of shifting the transmission ratio to a speed-reduction side, while keeping the trunnion out of contact with a stopper in the direction of the trunnion axis, when the deviation cannot be compensated for by electronically feedback-controlling the transmission ratio based on the deviation.

13. The method as claimed in claim 12, further comprising:

estimating a predicted transmission ratio based on the output-disk speed and a transmission ratio detected before a transition to a state wherein the transmission ratio cannot be detected occurs, assuming that the transmission ratio diverges to a speed-increase side at a maximum ratio-changing speed during a time period from a time when the transition occurs to a current control cycle; and generating the abnormal-period command signal that ratio changing is directed to the speed-reduction side assuming that the predicted transmission ratio is equivalent to the transmission ratio, when the deviation cannot be compensated for by electronically feedback-controlling the transmission ratio based on the deviation and additionally the transmission ratio cannot be detected due to a sensor system failure.

14. The method as claimed in claim 12, further comprising:

calculating a collision avoidance boundary value of the step-motor displacement that the displacement of the trunnion corresponds to a position of the stopper in the direction of the trunnion axis when the tilt angle corresponds to a tilting-motion stopper position of the speed-reduction side; and generating the abnormal-period command signal that ratio changing is directed from the collision avoidance boundary value of the step-motor displacement to the speed-reduction side in the forward operating mode, when the deviation cannot be compensated for by electronically feedback-controlling the transmission ratio based on the deviation and additionally the transmission ratio cannot be detected due to a sensor system failure.

15. The method as claimed in claim 12, further comprising:

detecting an input shaft torque acting on the input disk;

calculating a trunnion displacement error based on the transmission ratio and the input shaft torque; the trunnion displacement error resulting in a ratio change and occurring due to a looseness between the trunnion and the power roller and a torque shift caused by the input shaft torque acting on the input disk during operation of the toroidal continuously variable transmission; and compensating for the abnormal-period command signal based on the trunnion displacement error.

16. The method as claimed in claim 12, further comprising:

determining a vehicle's traveling direction;

estimating a maximum driving speed of the step motor;

determining that the deviation cannot be compensated for by electronically feedback-controlling the transmission ratio based on the deviation under a particular condition where the vehicle is traveling backward and additionally the maximum driving speed is less than a predetermined driving-speed threshold value; and generating the abnormal-period command signal to realize the step-motor displacement capable of shifting the transmission ratio to the speed-reduction side, while keeping the trunnion out of contact with the stopper in the direction of the trunnion axis in the reverse operating mode, under the particular condition.

17. The method as claimed in claim 16, further comprising:

determining a vehicle's traveling direction based on a shift lever position;

switching from a temporary determination that the vehicle is in one of the forward and reverse operating modes to a final determination that the vehicle is in the other operating mode when the deviation from the desired transmission ratio to a speed-increase side exceeds a predetermined deviation threshold value.

18. The method as claimed in claim 16, further comprising:

unconditionally estimating that the vehicle is in the reverse operating mode; and in case that the deviation from the desired transmission ratio to a speed-increase side exceeds a predetermined deviation threshold value, logically switching from a determination that the vehicle is in the reverse operating mode to a determination that the vehicle is in the forward operating mode when the reverse operating mode is estimated, and switching from a determination that the vehicle is in the forward operating mode to a determination that the vehicle is in the reverse operating mode when the forward operating mode is estimated.

19. The method as claimed in claim 16, further comprising:

detecting an oil temperature of the variator unit of the toroidal continuously variable transmission; and estimating the maximum driving speed of the step motor based on the oil temperature.

20. The method as claimed in claim 18, wherein:

the predetermined deviation threshold value is set to a maximum value of a normal-period transmission-ratio deviation; and the maximum value of the normal-period transmission-ratio deviation is set to a sum of a maximum value of a speed-increase side detection error of the transmission ratio and a maximum value of a torque-shift dependent transmission-ratio deviation.

* * * * *